(12) United States Patent
Innocent

(10) Patent No.: US 12,452,553 B2
(45) Date of Patent: Oct. 21, 2025

(54) TIME GATED PIXEL WITH HDR CAPABILITY

(71) Applicant: SEMICONDUCTOR COMPONENTS INDUSTRIES, LLC, Scottsdale, AZ (US)

(72) Inventor: Manuel H. Innocent, Wezemaal (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 132 days.

(21) Appl. No.: 18/604,820

(22) Filed: Mar. 14, 2024

(65) Prior Publication Data

US 2025/0294263 A1    Sep. 18, 2025

(51) Int. Cl.
*H04N 25/59* (2023.01)
*H04N 25/532* (2023.01)
*H04N 25/65* (2023.01)
*H04N 25/77* (2023.01)
*H04N 25/78* (2023.01)

(52) U.S. Cl.
CPC ........... *H04N 25/59* (2023.01); *H04N 25/532* (2023.01); *H04N 25/65* (2023.01); *H04N 25/77* (2023.01); *H04N 25/78* (2023.01)

(58) Field of Classification Search
CPC ...... H04N 25/59; H04N 25/532; H04N 25/65; H04N 25/77; H04N 25/78
See application file for complete search history.

(56) References Cited

U.S. PATENT DOCUMENTS

| | | |
|---|---|---|
| 9,843,738 B2 | 12/2017 | Cremers et al. |
| 9,900,481 B2 | 2/2018 | Geurts et al. |
| 9,942,492 B2 * | 4/2018 | Innocent ................ H04N 25/77 |
| 11,343,439 B2 | 5/2022 | Johnson |
| 11,743,616 B2 | 8/2023 | Tadmor et al. |
| 11,818,478 B2 | 11/2023 | Innocent et al. |

(Continued)

OTHER PUBLICATIONS

Innocent, Manuel , et al., "Differential image sensor with high common mode rejection", Proceedings of ESSCIRC, Grenoble, France, 2005, pp. 483-486.

(Continued)

*Primary Examiner* — Nhan T Tran
(74) *Attorney, Agent, or Firm* — Botos Churchill IP Law LLP

(57) ABSTRACT

The technology relates to enhanced time gated imaging in a manner that provides high dynamic range (HDR) functionality to a time gated pixel. An overflow path is provided for an integration node of a time-gated pixel, so that when the integration node saturates the excess charge flows to a low gain capacitor, creating readout signals from the integration node and the low gain capacitor, in order to obtain an HDR signal. A method includes modulating reset and transfer signals for an image sensor to selectively cause time-gated charge to accumulate in a photosensitive region of the image sensor, where the time-gated charge corresponds to a selected distance range. Then the charge is transferred to a charge storage region, and a saturated portion of the accumulated charge in stored a capacitor of the image sensor element. An HDR image is constructed from read-out of the charge storage region and the capacitor.

20 Claims, 17 Drawing Sheets

(56) References Cited

U.S. PATENT DOCUMENTS

| | | |
|---|---|---|
| 2016/0344965 A1 | 11/2016 | Grauer et al. |
| 2017/0234976 A1 | 8/2017 | Grauer et al. |
| 2019/0181169 A1 | 6/2019 | Tadmor et al. |
| 2020/0018834 A1* | 1/2020 | Boutaud .............. G01S 7/4808 |
| 2021/0333404 A1* | 10/2021 | Tadmor .................. G01S 7/484 |
| 2021/0337149 A1 | 10/2021 | Tadmor et al. |
| 2023/0300497 A1* | 9/2023 | Uno ................... H10F 39/8033 |
| | | 348/308 |
| 2024/0155259 A1* | 5/2024 | Eshel .................... H04N 25/59 |

OTHER PUBLICATIONS

Wang, Xinyang, et al., "An 89dB Dynamic Range CMOS Image Sensor with Dual Transfer Gate Pixel", Paper No. R36, CMOSIS nv, Coveliersstraat 15, 2600 Antwerpen, Belgium, 2011, 4 pages.

* cited by examiner

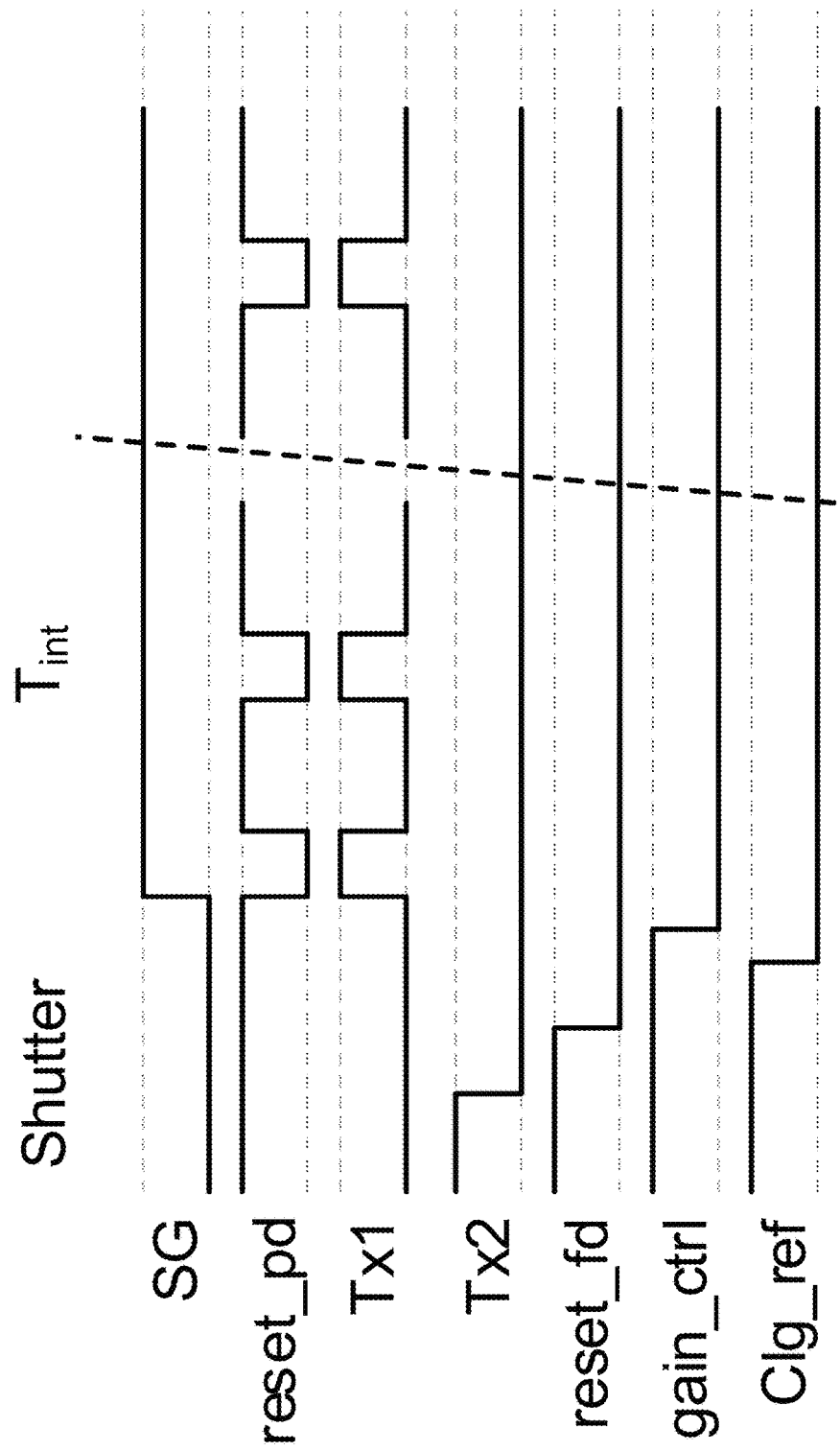

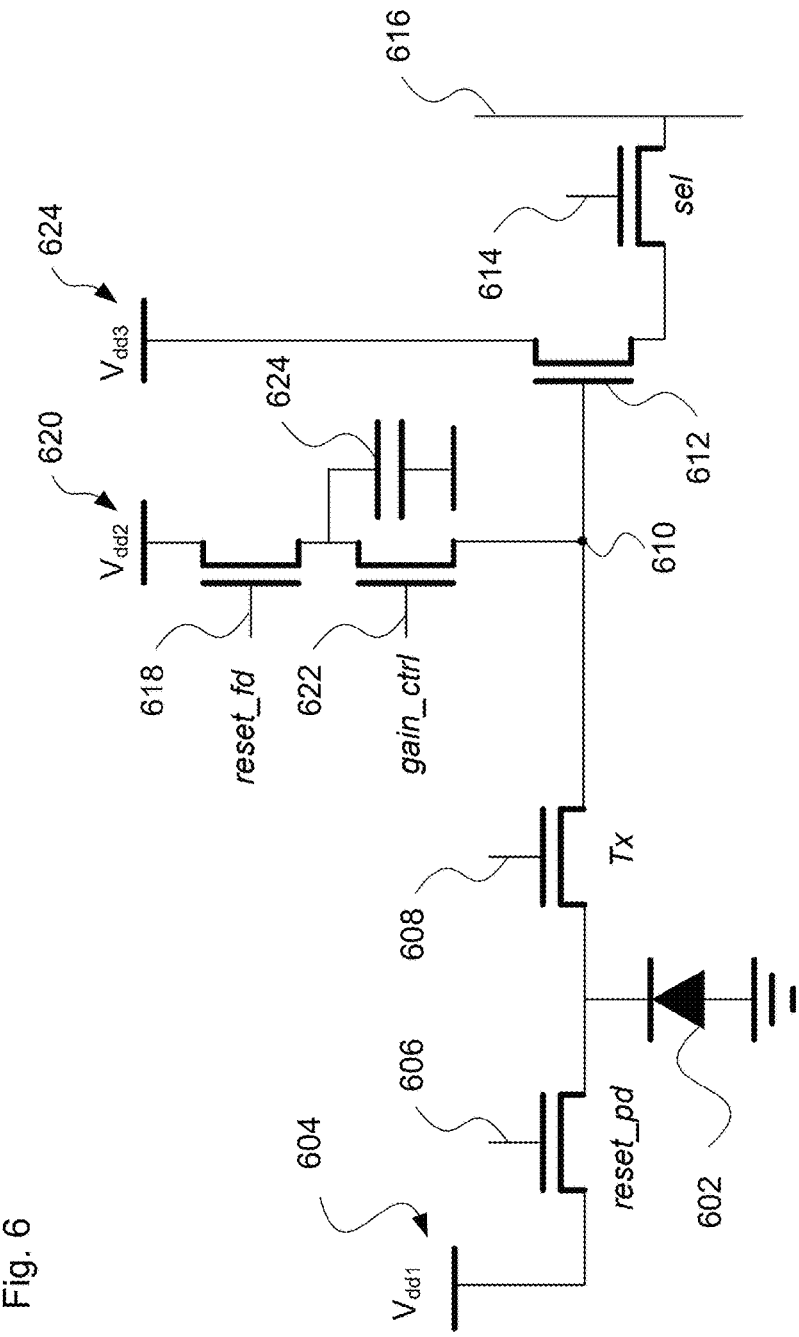

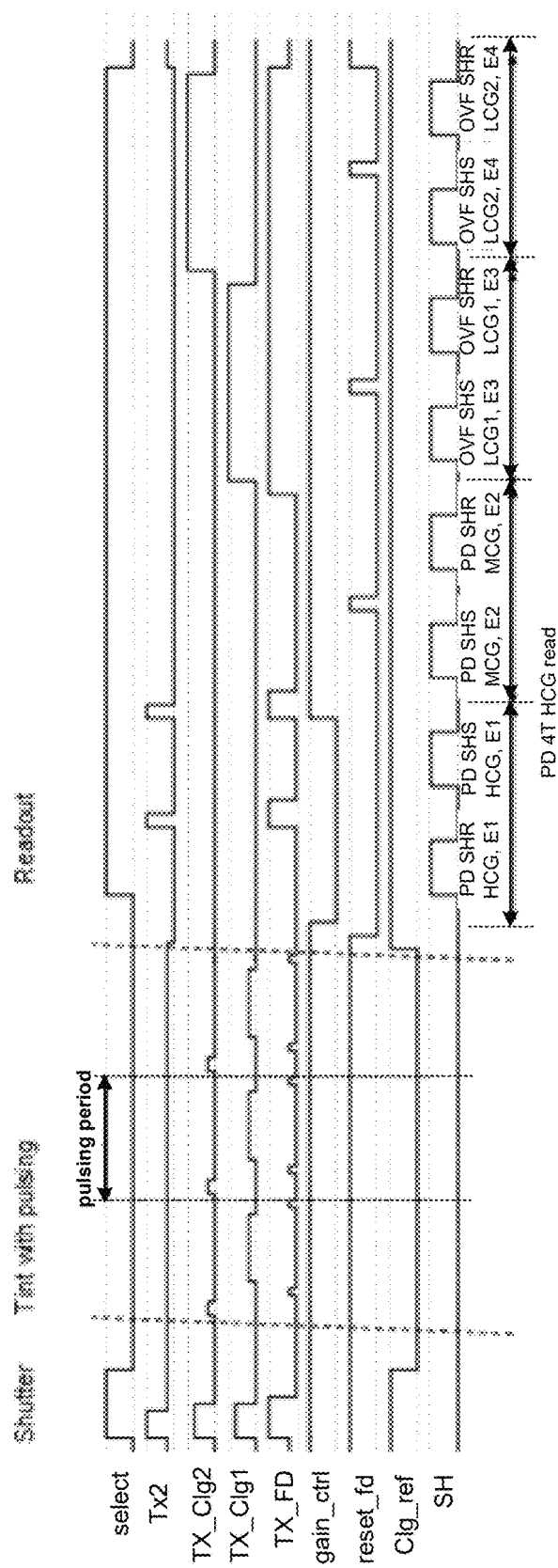

TIME GATED PIXEL WITH HDR CAPABILITY

BACKGROUND

Time gated imaging is able to synchronize a global shutter-type image sensor with a light pulse sent from a light source, which may be an infrared (IR) light source. By synchronizing the image sensor with the light source, the time gating is able to capture light that was reflected at a certain distance range from the imaging device. This can reduce sensor sensitivity to reflections from very nearby objects, such as raindrops or snowflakes.

This approach enables capturing superior images in adverse weather conditions like rain, snow or fog. It also enables the imaging device to capture images at night or other low-light conditions that are uniformly illuminated with distance, by increasing the intensity of the light pulse with the distance of the slice of the scene that is captured. Typically, a time gated image sensor may accumulate the light of many consecutive light pulses sent from the source to reach a sufficient signal.

The light pulse intensity or the number of pulses can be tuned with distance such that a reflection on a white surface would not saturate the sensor. However, in cases where there are highly reflective surfaces or transmitting sources, for instance mirrors, headlights or IR sources (e.g., lidar sensors or illumination sources) of vehicles along a roadway, a sensor with a typical dynamic range may become saturated. In addition, while the desired intensity or number of light pulses may be increased to see very dark colored objects, this may cause saturation of light-colored objects. Such issues can result in unsuitable imagery, which can have an adverse impact on devices or systems that rely on the imagery to function (e.g., a vehicle operating in an autonomous driving or flying mode).

BRIEF SUMMARY

The technology relates to enhanced time gated imaging, in particular to an approach that provides high dynamic range (HDR) functionality to a time gated pixel. An overflow path is provided for an integration node of a time-gated pixel, so that when the integration node saturates the excess charge flows to a low gain capacitor. This approach provides two readout signals: one from the integration node and one from the low gain capacitor. These signals may be added together or otherwise processed to obtain an HDR signal.

According to one aspect of the technology, an image sensor element comprises: a photosensitive region configured to generate charge in response to incident light on the image sensor element; a charge storage region configured to store at least a portion of the charge generated by the photosensitive region; a first actuating element electrically coupling the photosensitive region to the charge storage region, the first actuating element configured to enable charge transfer from the photosensitive region to the charge storage region according to a transfer control signal; a floating diffusion region coupled to the first actuating element; a second actuating element responsive to a gain control signal, the second actuating element having a first node connected to the floating diffusion region; a third actuating element responsive to a reset control signal, the third actuating element having a first node coupled to a second node of the second actuating element, and a second node coupled to a voltage supply; a capacitor having a first node connected to the second node of the second actuating element, the capacitor being operatively coupled to the first node of the third actuating element; and readout control circuitry configured to read out charge stored in the charge storage region and charge stored by the capacitor. During operation, the second actuating element, in response to the gain control signal, is configured to electrically couple the capacitor to the floating diffusion region to receive a saturated portion of the charge generated by the photosensitive region. Integration for imaging is time-gated to correspond with a pulsed light source to achieve a selected distance range detectable by the image sensor element. And a high dynamic range image is constructable from the read out of the charge stored in the charge storage region and the charge stored by the capacitor according to the time-gated integration.

In one example, the third actuating element, in response to the reset control signal, is configured: in a first mode, to reset the capacitor but not reset the floating diffusion region; and in a second mode, to reset at least both the floating diffusion region and the capacitor. Alternatively or additionally, the second actuating element is configured to set a selectable overflow threshold for an amount of the saturated portion of the charge to be received by the capacitor.

Alternatively or additionally to any of the above, the charge stored by the capacitor may represent a low gain image signal. In this case, at read out by the readout control circuitry, a reset voltage level is subtracted from the low gain image signal for a double sampling read with uncorrelated noise of the low gain image signal. Alternatively or additionally to any of the above, in one scenario, the readout control circuitry is configured to first read out the charge stored in the charge storage region and then read out the charge stored by the capacitor. And in another scenario, the readout control circuitry is configured to first read out the charge stored by the capacitor and then read out the charge stored in the charge storage region.

Alternatively or additionally to any of the above, the image sensor element further comprises a fourth actuating element disposed between the floating diffusion region and the charge storage region. In this example, the transfer control signal for the first actuating element is a first transfer control signal, the fourth actuating element is responsive to a second transfer control signal, and a level of the second transfer control signal sets an overflow threshold for an amount of the saturated portion of the charge to be received by the capacitor.

For this configuration, the capacitor may be a first capacitor and the gain control signal may a first gain control signal. In this case, the image sensor element further comprises: a fifth actuating element responsive to a second gain control signal, the fifth actuating element having a first node connected to the second node of the second actuating element; and a second capacitor having a first node connected to a second node of the fifth actuating element. Moreover, in this case the first node of the third actuating element coupled to the second node of the fifth actuating element and to first node of the second capacitor, the first gain control signal is used to read out charge from the first capacitor, and the second gain control signal is used to read out charge from the second capacitor. In one example, overflow charge from the charge storage region is able to flow into the second capacitor upon overflow of the first capacitor. In another example, capacitance of the second capacitor is greater than capacitance of the first capacitor. In a third example, the high dynamic range image is constructable from the read out of the charge stored in the charge storage region, the charge stored by the first capacitor, and the charge stored by the second capacitor. Each of these examples may be complementary to one another. Moreover the fifth actuating element may a coupled gate arrangement and is configured to modulate overflow current in the time domain. In this case, modulation of overflow current is performed synchronously with integration gating.

Alternatively or additionally to any of the above, the image sensor element may be configured to perform a global shutter operation.

According to another aspect of the technology a method comprises: causing an illumination module of an imaging system to emit one or more light pulses; modulating a reset signal and a transfer signal for an image sensor element to selectively cause time-gated charge to accumulate in a photosensitive region of the image sensor element in response to incident light thereon, the time-gated charge corresponding to a selected distance range for the imaging system; transferring the time-gated charge to a charge storage region of the image sensor element; storing a saturated portion of the time-gated charge accumulated by the photosensitive region in a capacitor of the image sensor element; and constructing a high dynamic range image from read-out of any time-gated charge stored in the charge storage region and the saturated portion of the time-gated charge stored by the capacitor, according to the selected distance range.

In one example, the method further comprises selectively setting an overflow threshold for an amount of the saturated portion of the time-gated charge to be received by the capacitor. Alternatively or additionally, the charge stored by the capacitor may represent a low gain image signal. In this case, at read out by readout control circuitry of the image sensor element, the method may further include subtracting a reset voltage level from the low gain image signal for a double sampling read with uncorrelated noise of the low gain image signal. Alternatively or additionally to any of the above, the method may further comprise performing, by readout control circuitry of the image sensor element, reading out the charge stored in the charge storage region and then performing reading out the charge stored by the capacitor.

According to a further aspect of the technology, an imaging system is provided, which comprises an illumination module configured to emit one or more light pulses, and an image sensor element. The image sensor element comprises: a photosensitive region configured to generate charge in response to incident light on the image sensor element; a charge storage region configured to store at least a portion of the charge generated by the photosensitive region; a first actuating element electrically coupling the photosensitive region to the charge storage region, the first actuating element configured to enable charge transfer from the photosensitive region to the charge storage region according to a transfer control signal; a floating diffusion region coupled to the first actuating element; a second actuating element responsive to a gain control signal, the second actuating element having a first node connected to the floating diffusion region; a third actuating element responsive to a reset control signal, the third actuating element having a first node coupled to a second node of the second actuating element, and a second node coupled to a voltage supply; a capacitor having a first node connected to the second node of the second actuating element, the capacitor being operatively coupled to the first node of the third actuating element; and readout control circuitry configured to read out charge stored in the charge storage region and charge stored by the capacitor. During operation, the second actuating element, in response to the gain control signal, is configured to electrically couple the capacitor to the floating diffusion region to receive a saturated portion of the charge generated by the photosensitive region. Integration for imaging is time-gated to correspond with pulsing by the illumination module to achieve a selected distance range detectable by the image sensor element. And a high dynamic range image is constructable from the read out of the charge stored in the charge storage region and the charge stored by the capacitor according to the time-gated integration.

In one example, the second actuating element is configured to set a selectable overflow threshold for an amount of the saturated portion of the charge to be received by the capacitor.

BRIEF DESCRIPTION OF THE DRAWINGS

FIG. 5A illustrates an example of shutter and integration timing in accordance with aspects of the technology.

FIG. 6 is another circuit diagram in accordance with aspects of the technology.

FIG. 9B is a timing diagram corresponding to operation of the circuit of FIG. 9A.

DETAILED DESCRIPTION

Figure 1:
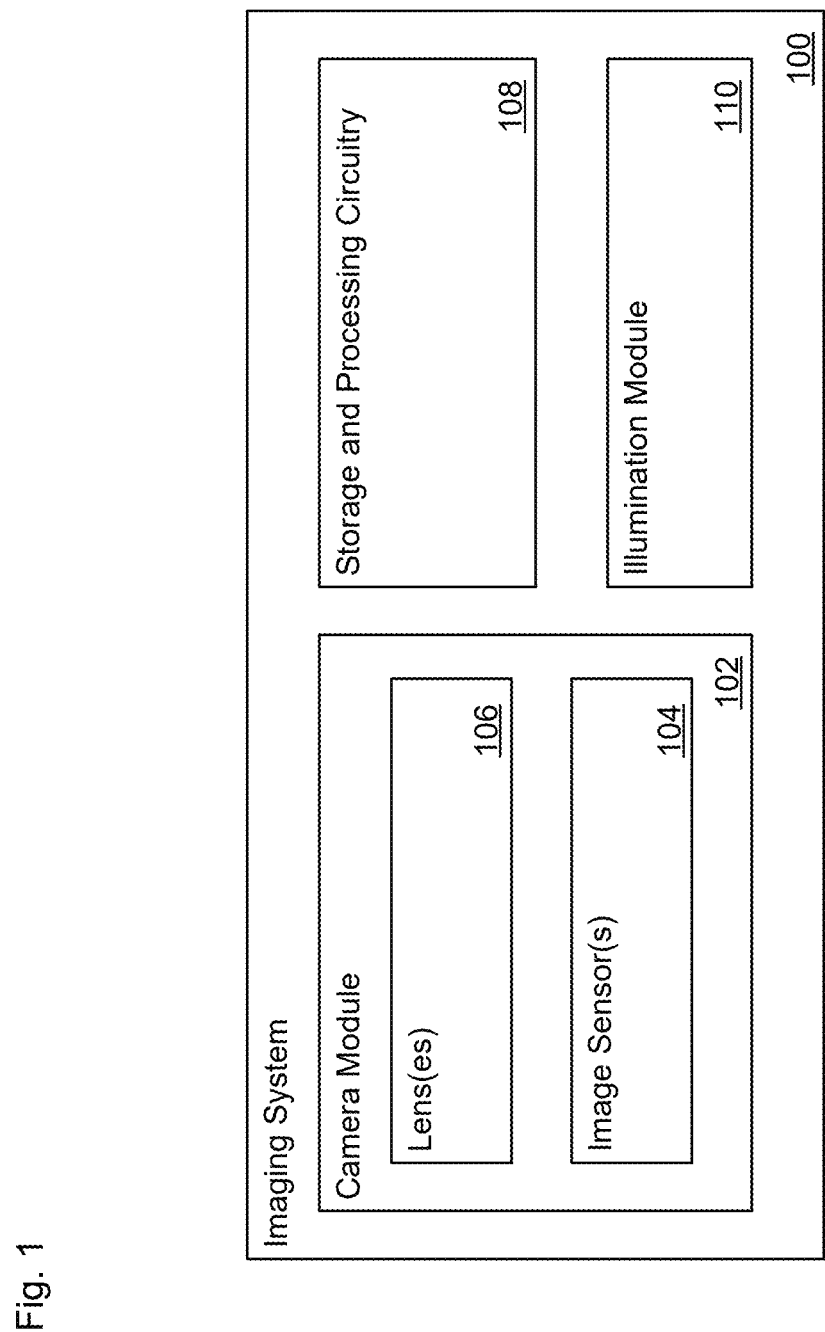
FIG. 1 illustrates an exemplary imaging system in accordance with aspects of the technology.

As noted above, the technology provides HDR functionality to a time gated pixel imaging approach. Time gated imaging is a way to obtain an image that is at a certain distance from a camera and its light source. In time gated imaging, the shutter may only open when reflected light is expected to come back to the image sensor. For instance, if it is desirable to detect objects that are 50-100 meters away, the shutter is timed to be open to account for the round trip time it would take for light to travel that distance from the light source and back for reception by the image sensor. Objects illuminated by the light source that are farther (or closer) would not be captured by the imagery because the shutter would be closed when reflected light would reach the image sensor.

In a global shutter approach, every pixel in the image sensor is configured to simultaneously capture an image. All of the pixels can be reset simultaneously. Then a charge transfer operation is performed to simultaneously transfer the charge collected in the photodiode of each image pixel to an associated charge storage region. The data from each storage region can then be read out on a per-row basis.

Time gated imaging allows an imaging system to build up a scene in different "slices", in which images are captured at different distances. It is possible to make the light source brighter for farther slices, which can be done to achieve equal brightness at the different distances. The light level can also be increased as needed depending on environmental conditions, such as when there is heavy snow, rain, etc. Pixels should be configured to have very fast shuttering (e.g., modulating up to 100 MHz or higher).

Time gated imaging synchronizes the (global shutter) sensor with a light pulse sent from the light source. This may be an IR light source. By synchronizing the sensor with the light source, the time gated sensor only captures light that was reflected at a certain distance range away. This makes the sensor insensitive to reflections on nearby objects like e.g., raindrops that are close by.

This mechanism allows capturing superior images in poor weather conditions, such as rain, snow or fog. It also allows the system to capture images at night or other low-light situations that are uniformly illuminated with distance by increasing the intensity of the light pulse with the distance of the slice of the scene that is captured. A time gated image sensor may accumulate the light of a number of consecutive light pulses sent from the source to reach a sufficient signal, such as 5-10 consecutive light pulses or more.

The light pulse intensity and/or the number of pulses can be tuned with distance such that a reflection off of a white or other reflective surface would not saturate the sensor. However, in case of highly reflective surfaces or transmitting sources (e.g., IR sources on nearby vehicles along a roadway) a sensor with a conventional dynamic range may become saturated. Moreover, the desired intensity or number of light pulses may be increased to see very dark colored objects while still saturating light colored objects. An HDR time gated sensor addresses this problem, providing a robust imaging solution when operating in challenging conditions. This approach, including various device configurations, is discussed further herein.

Example Imaging System

FIG. 1 is a block diagram 100 of an exemplary imaging system, such as an electronic device that employs sensor circuitry (also referred to as a sensor module) to capture imagery. Imaging system 100 may comprise or be part of a still or video camera, a webcam, a mobile phone, a laptop or tablet computer, a video surveillance system, a vehicle imaging system, a video game system with imaging capabilities, an augmented reality (AR) and/or virtual reality (VR) system, an unmanned aerial vehicle system (such as a drone), a commercial or industrial system, etc. Camera (or imaging) module 102 is configured to convert incoming/received light into digital image data. Camera module 102 includes one or more image sensors (or sensor modules) 104.

During an image capture process, light from a scene is focused onto the image sensor(s) 104 by one or more corresponding lenses 106. Image sensors 104 may include circuitry for generating analog pixel image signals and circuitry for converting those image signals into corresponding digital image data. The digital image data may be provided to storage and processing circuitry 108.

Storage and processing circuitry 108 may include, e.g., one or more integrated circuits (ICs), such as image processing circuits, microprocessors, storage devices such as random-access memory (RAM) and/or non-volatile memory (NVM), etc. This circuitry may be implemented using components that are separate from camera module 102 or that may form part of camera module 102. When storage and processing circuitry 108 is implemented on different ICs than those implementing camera module 102, the ICs with circuitry 108 may be stacked or otherwise packaged with the ICs for camera module 102.

Image data that has been captured by camera module 102 may be processed and stored using processing circuitry 108 (e.g., using an image processing engine of processing circuitry 108, using an imaging mode selection engine on processing circuitry 108, etc.). Processed image data may be provided to external equipment such as a computer, a vehicle control system, an external display, or other devices using a wired or wireless communications path coupled to processing circuitry 108 (not shown).

In the example of FIG. 1, camera module 102 includes illumination module 110, which is configured to emit light for illuminating objects in an image scene. Image sensor(s) 104 may be configured to gather reflected versions of the emitted light and to generate image information for the scene. By way of example only, such image information may include depth or distance information for one or more objects, a depth or distance map of the image scene, an image of the image scene, etc.

Illumination module 110, such as a light emitter controlled by the driver circuitry, may emit light having any suitable characteristic(s). This can include any suitable waveform, peak amplitude or power, periodicity or frequency, pulses of light, light with a modulated amplitude and a modulation frequency, etc. The emitted light may be in the infrared (IR) and/or optical bands, and may be generated by an LED or a laser configured to emit one or more light pulses, such as in a light pulse train. The emitted light may reach one or more objects in an image scene and reflect off of such objects, returning to the camera module 102 as reflected light. Objects 13 may include any suitable objects, whether fixed or mobile. By way of example only, in a driving scene for a vehicle operating in an autonomous (or manual) driving mode, objects may include signage, street light, driving or bike lanes, curbs or sidewalks, other road users (e.g., other vehicles, bicyclists or pedestrians), trees or shrubbery, etc.

Reflected light may be received at the image sensor 104 (e.g., at one or more active image pixels, at one or more photosensitive elements in the active image pixels, etc.). Driver circuitry and/or control circuitry may control the pixels to generate one or more image frames based on the reflected light, such as by providing control signals coupled to transistors or other actuated elements (e.g., switching elements) in the pixels. In particular, based on the received control signals from the driver circuitry and/or control circuitry, the pixels may generate different portions of charge in response to reflected light (e.g., during an integration or exposure time period), may perform one or more readout operations on the generated portions of charge (e.g., during a readout time period), or may perform other operations during other time periods.

In configurations where illumination module 14 and sensor module 16 operate in an indirect time-of-flight (TOF) sensing scheme, processing circuitry for the TOF sensor (e.g., coupled to sensor module 16) may use a phase difference between emitted light signal 15 and reflected light signal 17 (collected by sensor module 16) to determine (e.g., calculate or look up) TOF information for the scene.

Processing circuitry in camera module 102 or processing circuitry in the imaging system 100) may control illumination module 110 and know the characteristics of the emitted light signal. The processing circuitry may then control the image sensor(s) 104 to generate image signals for one or multiple image frames, which are indicative of the characteristics of the reflected light signal. The system may process (e.g., compare and correlate) the generated image signals for these image frames to the reflected light and to emitted light to determine a phase difference and/or time of flight information.

Example Saturation Scenario

Figure 2:
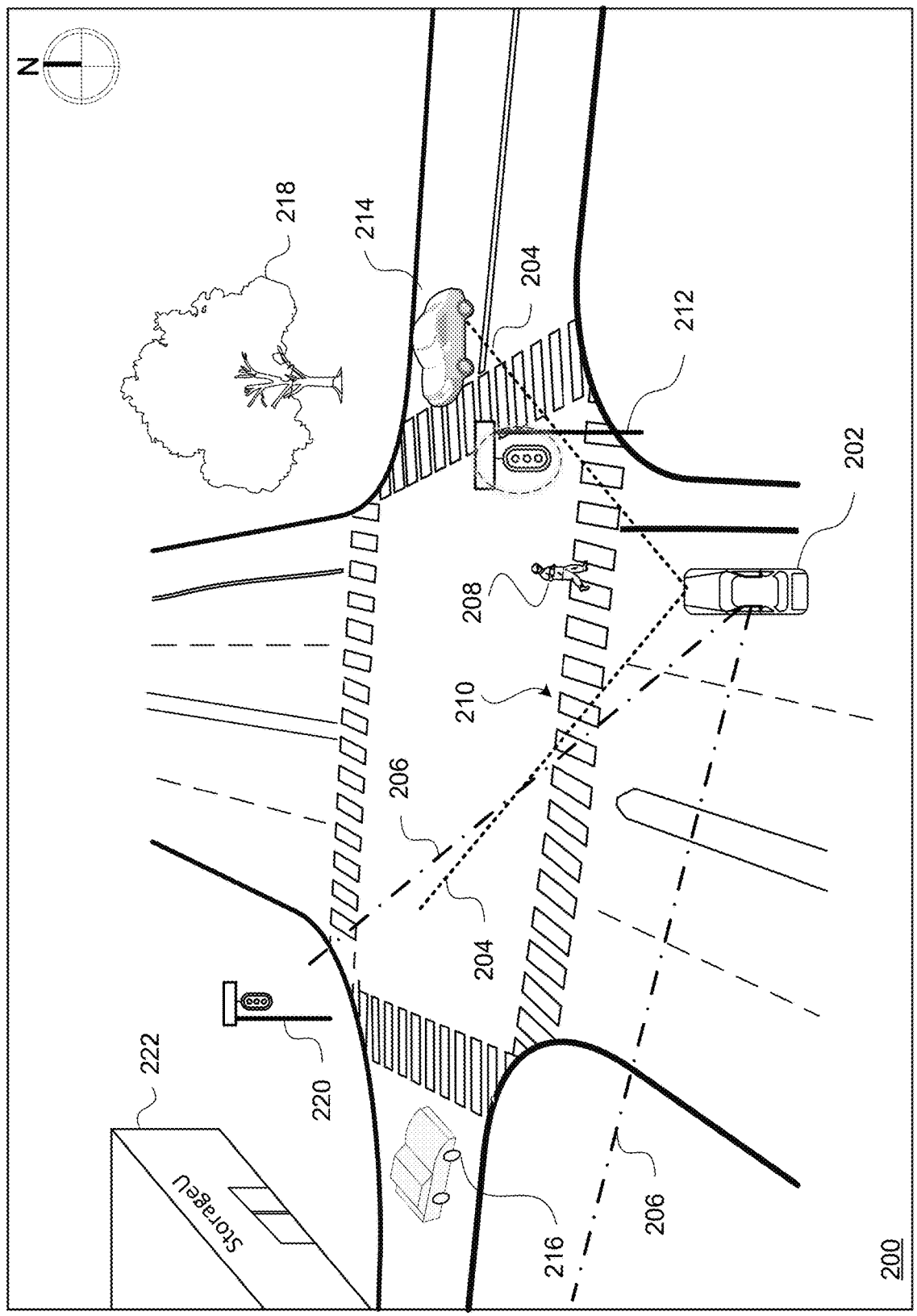
FIG. 2 illustrates an example image capture scene in accordance with aspects of the technology.

FIG. 2 illustrates an exemplary image sensing scenario 200, where the image sensor(s) are part of a perception system of a vehicle 202. The perception system may be configured to obtain imagery from one or more fields of view of the vehicle, such as a front-facing field of view indicated by dotted lines 204, or a side facing field of view as indicated by dash-dot lines 206. Note that in this example, the fields of view 204 and 206 overlap. As shown, there are a number of objects in the nearby external environment of the vehicle 202. Those objects include pedestrian 208, crosswalk 210, a traffic light 212 on the southeast corner of the intersection, vehicle 214 heading westbound, vehicle 216 heading eastbound, tree 218, a traffic light 220 on the northwest corner, and a store 222.

The image sensors arranged along the vehicle to provide the different fields of view may each have an illumination module. The light emitted from the illumination module(s) may be modulated or otherwise controlled so that reflected light received from the external environment corresponds to objects at specific distances or within specific ranges. By way of example, this may be done with the front-facing image sensor to obtain imagery including the pedestrian 208, who may be 10-15 meters from the vehicle, as well as the vehicle 214, which may be 25-40 meters from the vehicle. Similarly, this may be done with the side-facing image sensor to obtain imagery of the vehicle 216, which may be 50-60 meters away, the traffic light 220, which may be 60-75 meters away, and the store 222, which may be 80-100 meters from the vehicle.

The return light is focused onto the image sensors. As noted above, a reflection on a white or other light-colored surface may or may not saturate the sensor(s). Thus, the crosswalk 210, which may include retroreflective white paint, may adversely impact sensor operation. Moreover, headlights, mirrors, or IR emitters from the vehicles 214 and/or 216 (e.g., where those vehicles include lidar sensors or IR illuminators for their onboard perception systems) can also create a saturation situation. This may adversely affect the image sensors of the vehicle 202 from capturing imagery encompassing the pedestrian 208, or the color of the traffic lights 212 and/or 220.

Example Pixel Array and Readout Assembly

Figure 3:
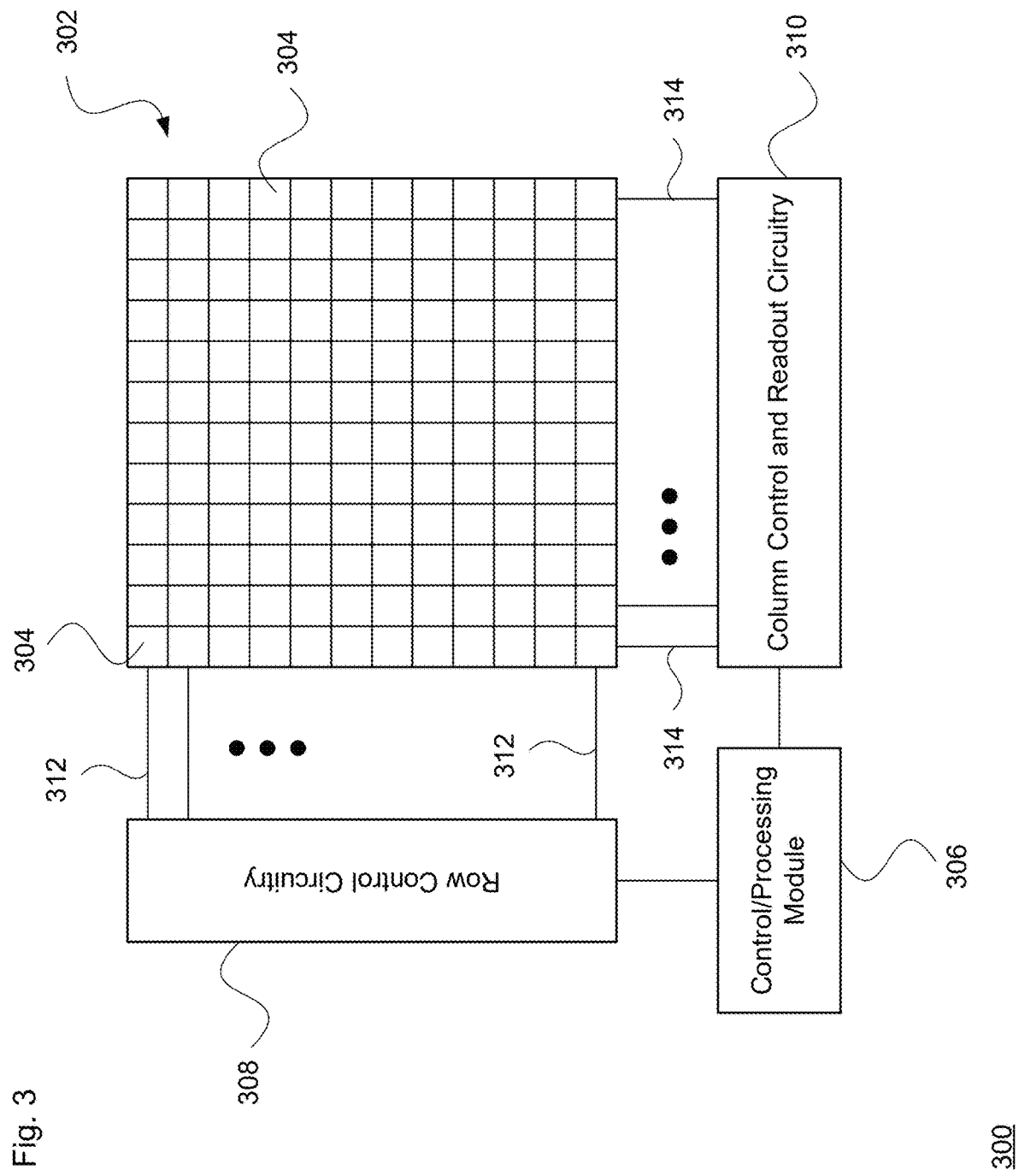
FIG. 3 is a block diagram of a pixel array and readout assembly for an image sensor in accordance with aspects of the technology.

FIG. 3 is a diagram 300 of an illustrative configuration for a pixel array and readout assembly for the image sensor 104 of FIG. 1. As shown in FIG. 3, the assembly 300 includes a pixel array 302 containing sensor pixels 304 arranged in rows and columns, along with control and processing circuitry in module 306. The array 302 may contain, for example, tens, hundreds, or thousands of rows and columns of sensor pixels 304. Module 306 may be coupled to row control circuitry 308 (sometimes referred to as row driver circuitry or pixel driver circuitry) and column control and readout circuitry 310 (sometimes referred to as column readout circuitry or column control circuitry, readout circuitry, or column decoder circuitry). Control module 306 may receive (row) addresses from row control circuitry 308 and supply corresponding (row) control signals such as reset, anti-blooming, row select (or pixel select), modulation, storage, charge transfer, readout, sample-and-hold, and/or store control signals to pixels 304 over (row) control paths 312.

One or more lines such as column lines 314 may be coupled to each column of pixels 304 in array 302. Column lines 314 may be used for reading out image signals from pixels 304 and for supplying bias signals (e.g., bias currents or bias voltages) to pixels 304. The column control and readout circuitry 310 may receive image signals (e.g., analog pixel values generated by pixels 304) over lines 314. This circuitry 310 may include memory circuitry for storing calibration signals (e.g., reset level signals, reference level signals) and/or image signals (e.g., image level signals) read out from the array 302, amplifier circuitry or a multiplier circuit, analog to digital conversion (ADC) circuitry, bias circuitry, latch circuitry for selectively enabling or disabling the portions (columns) of the circuitry 310, or other circuitry that is coupled to one or more pixels in array 302 for operating pixels 304 and for reading out image signals from pixels 304. ADC circuitry in the circuitry 310 may convert analog pixel values received from array 302 into corresponding digital pixel values (sometimes referred to as digital image data or digital pixel data). The circuitry 310 may supply digital pixel data to control/processing module 306 for pixels 304 (e.g., in one or more pixel columns).

The pixel array 302 may also be provided with a filter array having multiple (color) filter elements each corresponding to a respective pixel, which allows a single image sensor to sample light of different colors or sets of wavelengths. In general, filter elements of any desired color and/or wavelength (e.g., optical or infrared wavelengths) and in any desired pattern may be formed over any desired number of image pixels 304. By way of example, for time-of-flight sensing using an illumination source (e.g., in illumination module 110 in FIG. 1), the pixel array 302 may be provided with a correspond filter array that passes light having colors and/or frequencies emitted from the illumination source.

The image sensors 104 of camera module 102 (FIG. 1) may include one or more arrays 302 of image pixels 304. The image pixels 304 may be formed in a semiconductor substrate using complementary metal-oxide-semiconductor (CMOS) technology, charge-coupled device (CCD) technology, or any other suitable photosensitive device technology. Image pixels 304 may be frontside illumination (FSI) image pixels or backside illumination (BSI) image pixels. Moreover, the array 302 may include pixels 304 of different types such as active pixels, optically shielded pixels, reference pixels, etc. If desired, the image sensor(s) may include an integrated circuit package or other structure in which multiple integrated circuit substrate layers (e.g., from multiple wafers) or chips are vertically stacked or otherwise arranged with respect to each other.

Example Imaging Circuitry

There are various circuitry configurations that may be used to achieve high dynamic range functionality with a time-gated pixel. The following discussion presents a number of different circuitry configurations, although the invention is not limited to these specific configurations.

Figure 4A:
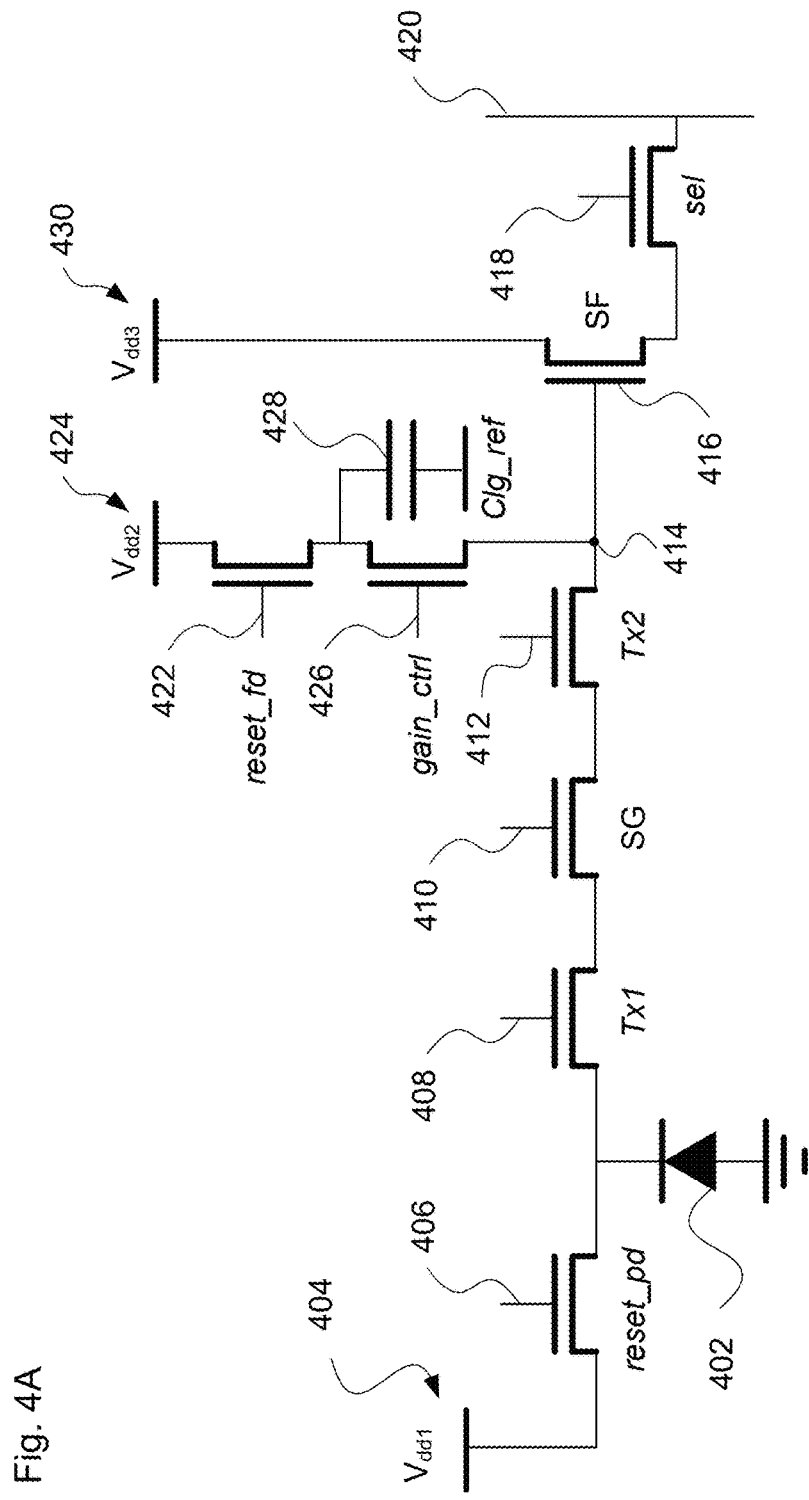
FIGS. 4A-B illustrate circuit diagrams in accordance with aspects of the technology.

FIG. 4A is a circuit diagram 400 of an illustrative image sensor pixel (e.g., any of pixels 304 of FIG. 3). The pixel includes a photosensitive region (e.g., photodiode 402).

Photodiode 402 may receive incident light over a period of time (an exposure time) and generate an image signal corresponding to the incident light over the exposure time. In certain imaging systems, image artifacts may be due to moving objects, the moving or shaking of the image sensor, flickering of the lighting, and/or objects with variable illumination in an image frame. Such artifacts can include, for example, a missing part of an object, edge color artifacts, object distortion, etc. Examples of objects with changing illumination can include light-emitting diode (LED) signage (which may flicker several hundred times per second), as well as LED brake lights or headlights of vehicles. A diagram illustrating timing for illumination of the light source and integration for charge accumulation corresponding to a particular distance is presented further below.

Image signals generated with a short integration time and a short exposure time may miss the flickering light (e.g., an LED pulsing at a given frequency). However, by spreading the short integration time over a longer exposure time, this reduces the chance to miss the signal from the flickering light. The pixel may be configured to reduce artifacts due to light flickering by spreading a short integration time over a longer exposure time. Photodiode (PD) 402 may be coupled to a voltage source 404 having a first supply voltage $V_{dd1}$ through a photodiode reset transistor 406 (sometimes referred to as an anti-blooming transistor). When a control signal (e.g., a reset photodiode or "reset_pd" signal) is asserted (e.g., pulsed high) at the photodiode reset transistor 406, the photodiode 402 may be reset to the first supply voltage $V_{dd1}$. When the control signal reset_pd is de-asserted (e.g., pulsed low), the photodiode 402 may begin to accumulate charge from incident light.

Subsequent to photodiode reset, a given integration period may begin and the photodiode 402 may begin generating and storing an image signal. The pixel may include a first transfer transistor 408 and a storage region such as storage gate (SG) 410. While shown as the storage gate 410, the storage region may alternatively comprise a storage diode or a floating diffusion region.

When the given integration period ends, the first transfer transistor 408 may transfer the image signal stored at photodiode 402 to the storage gate 410 (or other storage element). The time between the beginning and the end of the given integration period may be referred to as a first integration time period. The transfer transistor 408 may include a source terminal, a drain terminal, a gate terminal, and a channel region. Depending on the configuration, the storage gate or other storage region 410 may be a doped-semiconductor region (e.g., a doped silicon region formed in a silicon substrate by ion implantation, impurity diffusion, or other doping techniques) that has charge storage capabilities (e.g., a capacitance). During system operation, integration can be performed once or multiple times. The time gating involves operation of the reset transistor 406 (with reset_pd) and the transfer transistor 408 (with Tx1). As discussed further below with regard to the timing diagram of FIG. 5C, the integration is time gated, where the transistors 406 and 408 are toggled in synchronization with emitted light from the illumination module (e.g., module 110 of FIG. 1), according to the desired distance (range) to be detected.

Photodiode 402 may be connected to a first terminal (e.g., a source or drain terminal) of the transfer transistor 408. The storage gate 410 may be connected to a second terminal that opposes the first terminal of the transfer transistor 408. As an example, if the first terminal is the source terminal, the second terminal may be the drain terminal, or vice versa. An applied control signal Tx1 may control both a flow of charge across the channel of the transistor 408 and a flow of charge into storage gate 410. When control signal Tx1 is asserted, image signals stored in the photodiode 402 may pass through the channel region of the transistor 408 and into the storage gate 410. Control signal Tx1 may be subsequently de-asserted and the photodiode 402 may be reset to a supply voltage using control signal reset_pd.

A second integration period may follow the first integration period. The photodiode 402 may generate an image signal corresponding to the second integration period. The image signals from the second integration period may be transferred to storage gate 410 using control signal Tx1. The image signal from the second integration period may be integrated (e.g., summed or added) with the image signal from the first integration period. The integrated image signal stored at the storage gate 410 may be said to have an effective integration time period. The effective integration time period is the summation of the first integration time period and a second integration time period (corresponding to the time between the beginning and end of the second integration period).

In general, any number of desired integration processes (e.g., transferring image signals from distinct integration periods to the storage gate 410 for summation) may occur. The effective integration period may be generally defined as summation of all of the distinct integration time periods, over which all of the respective individual image signals were generated. After a desired number of integration periods and integration of the corresponding image signals at the storage gate 410, control signal Tx1 may be de-asserted to add a last image signal. By breaking up the effective integration period during an image frame into shorter, non-continuous integration periods that span a longer exposure time (using time gating), flickering lighting and/or objects with changing illumination may be minimized without compromising pixel integration time (in other words, while maintaining the desired total integration time).

As shown, the pixel in this configuration includes second transfer transistor 412. The transfer transistor 412 has a gate terminal that is controlled by second transfer control signal Tx2. The transfer control signal Tx2 may be pulsed high to transfer charge from storage gate 410 into node 414 (e.g., a floating diffusion ("fd") region). Node 414 may be a doped semiconductor region (e.g., a region in a silicon substrate that is doped by ion implantation, impurity diffusion, or other doping processes). This node 414 may serve as another storage region for storing charge during image data gathering operations, and may have a charge storage capacity (capacitance).

The pixel may include readout circuitry that includes a source follower transistor 416 and row select transistor 418. Transistor 418 may have a gate that is controlled by row select control signal sel. When a control signal sel is asserted, the transistor 418 is turned on and a corresponding output signal (e.g., an output signal having a magnitude that is proportional to the amount of charge at floating diffusion node 414) is passed onto a column readout path or bus line 420. The pixel may include floating diffusion reset transistor 422. This transistor 422 may have a gate that is controlled by a floating diffusion reset control signal reset_fd. The transistor 422 couples floating diffusion node 414 to a second supply voltage 424 (e.g., $V_{dd2}$) that may the same as or different from first supply voltage $V_{dd1}$. When control signal reset_fd is asserted, the transistor 422 is turned on and floating diffusion node 414 is reset to the second supply voltage level.

As shown in FIG. 4A, the pixel includes a gain select transistor 426 and a low gain capacitor 428. The transistor 426 may have a gate terminal controlled by a gain select control signal gain_ctrl. When control signal gain_ctrl is asserted, the transistor 426 is turned on and low gain capacitor 428 is coupled to floating diffusion node 414. Note that switching on reset_fd will only reset the capacitor 428, but will not reset floating diffusion node 414. Both control signals reset_fd and gain_ctrl are asserted to reset floating diffusion node 414 to the supply voltage level (e.g., $V_{dd2}$).

When the signal on the integration node (storage gate 410) saturates during the integration time, the signal will overflow over transfer transistor 412 and transistor 426 (gain control) onto the low gain capacitor 428. Tx2 sets the overflow barrier. Tx2 does not need to be pulsed high for this. It can be either pulsed to a medium level or it may be kept at a fixed barrier level. The gain_ctrl signal need not be not fully on, but it should be kept at a level that allows further overflow from the floating diffusion node 414 to the capacitor 428. This capacitor will then be used to integrate the overflow current.

During operation of the pixel, the second transfer transistor 412 may be set with an overflow threshold. The storage gate 410 may be configured to store integrated image signals from combining individual signals across multiple distinct integration periods. When integrated image signals at the storage gate 410 exceed the overflow threshold, charge is able to overflow to the floating diffusion region at node 414. The transistor 426 may remain on during any integration process occurring at the storage gate 410. Note that the transistor 426 may not be fully on. It may set another overflow barrier that allows charge to flow from the floating diffusion node 414 to the capacitor when the floating diffusion voltage goes sufficiently low. Since the transistor 426 is conductive, the overflowing charge will be stored by low gain capacitor 428, while the charge below the overflow threshold remains in the storage gate 410. As shown, the transistor 416 is coupled to a third supply voltage source 430, $V_{dd3}$, which may be the same or different than either $V_{dd1}$ or $V_{dd2}$.

During readout, the image signals on both low gain capacitor 428 and the storage gate 410 can be sampled. In particular, the low gain image signal stored by the capacitor 428 may be sampled by the readout circuitry, which includes transistors 416 and 418 and the bus line 420. Upon sampling, the floating diffusion may be reset via the reset_fd signal, and a reset voltage level may be sampled (e.g., $V_{dd2}$). The reset voltage level may be subtracted from the low gain image signal for a double sampling read with uncorrelated noise of the low gain image signal. Alternatively, an external offset calibrated for the reset voltage level may be used for the low gain image signal. After sampling the reset voltage level, the high gain image signal (at storage gate 410) may be sampled. Prior to reading out the high gain image signal, control signal gain_ctrl may be de-asserted. The high gain image signal readout may be a correlated double sampling (CDS) readout. A high dynamic range image can then be constructed using the low gain image signal and high gain image signal.

Note that the readout may be done using an origin mode approach, where each signal read-out will have a response starting at the origin. Alternatively, the readout may be done using a hockey stick mode approach, where the signal from storage gate 410 has immediate response, but overflow from the capacitor 428 would only have a response when there is overflow.

Thus, in this configuration a time-gated sensor includes the photodiode 402 that can be flushed to the supply voltage via reset_pd or connected to an integration node at the gate 410. The photodiode 402 may be kept in reset when integration is not desired. With time-gated sensing, integration may occur for every light pulse sent out. Every cycle may add a little additional charge to the storage gate. In this way, multiple light pulses can be integrated by toggling reset_pd at the transistor 406.

From the integration node (gate 410), there is an overflow path via transistors 412 and 416 to the low gain capacitor 428. The low level of Tx2 is the level that sets the overflow barrier. When the integration node saturates, the excess photo charge flows over the potential barrier of the transistor 412 onto the floating diffusion region at node 414, and then onto the capacitor 428. At the end of the integration time, the photodiode 402 can be kept in reset until the readout is complete and the next frame can be captured in a global shutter operation. In some arrangements, circuitry can be included to achieve a pipelined integrate while read operation.

The capacitance of capacitor 428 may be selected in view of the storage ability of the integration node (gate 410). By way of example only, the integration node 410 may be limited to handling on the order of 10,000-20,000 electrons (assuming approximately 1.6 microvolts is associated with every electron). In this case, the capacitor 428 may be selected to handle on the order of 1,000,000 electrons.

Note that dark current (leakage current) may flow through certain components of the circuitry even if there is no light coming into the sensor. For instance, the photodiode 402, storage gate 410 and capacitor 428 may each have a corresponding dark current. While typically very small, as the temp rises, the dark current will increase.

Figure 4B:
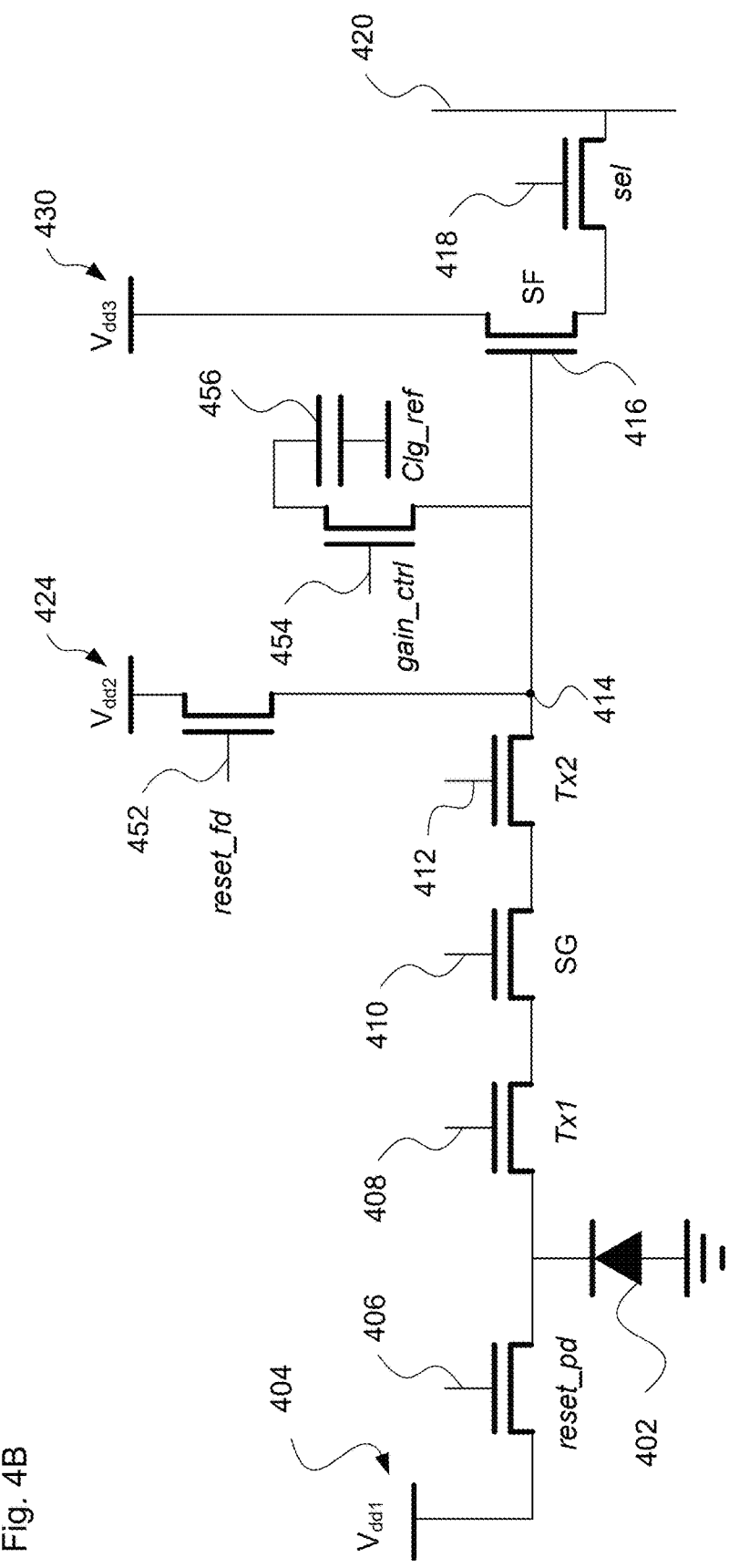

FIG. 4B illustrates an alternative configuration 450 to that illustrated in FIG. 4A. Here, the gain control transistor and storage capacitor are arranged in parallel with a floating diffusion reset transistor 452. Equivalent to FIG. 4A, the pixel includes a gain select transistor 454 and a low gain capacitor 456. The transistor 454 may have a gate terminal controlled by a gain select control signal gain_ctrl. When control signal gain_ctrl is asserted, the transistor 454 is turned on and low gain capacitor 456 is coupled to the floating diffusion region. Note that switching on reset_fd will only reset the floating diffusion region (node 414). Resetting the capacitor involves switching on both reset_fd and gain_ctrl. The circuit of FIG. 4B thus operates in an equivalent manner to the circuit of FIG. 4A. Moreover, corresponding parallel circuit configurations may be employed with any of the other examples discussed with respect to the subsequent figures. All such corresponding configurations are embodiments of the present technology.

FIG. 5A illustrates an example 500 of shutter and integration timing ("Tint") applied globally to the image sensor. During the integration time, the gated operation provided by the reset_pd and Tx1 signals are complementary. During the integration time there may be many cycles of reset_pd/Tx1, in particular a plurality of, e.g., 2, 3, 5, 10 or more cycles.

Figure 5B:
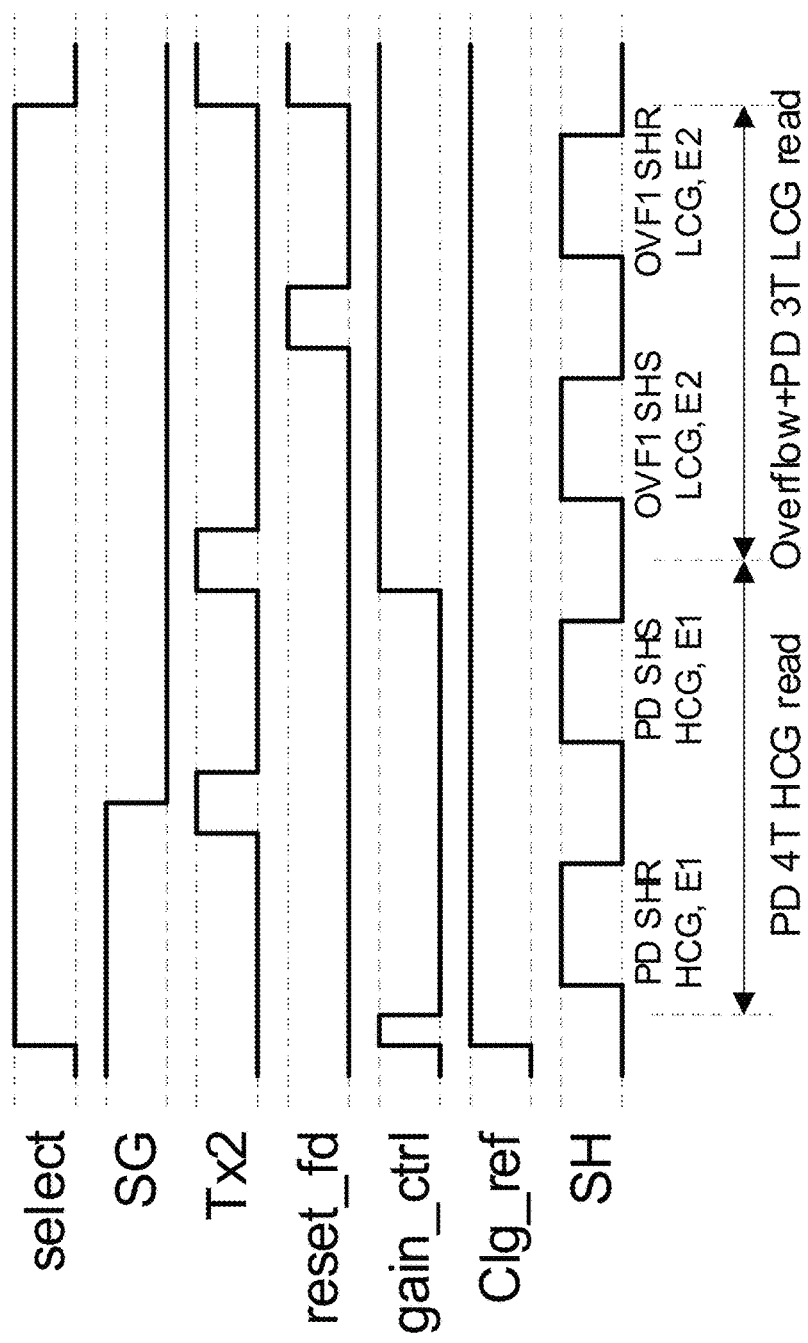
FIG. 5B illustrates an example of readout timing in accordance with aspects of the technology.

FIG. 5B illustrates an example 510 of readout timing, which is applied line by line (rolling readout). This example timing results in an origin mode readout where the high gain contains the storage gate charge (at gate 410) and the low gain read contains all charge stored on the storage gate (gate 410) plus the overflow capacitor (capacitor 428). As noted above, the low level signal Tx2 is the level that sets the overflow barrier. After readout, the high and low gain signals are combined by the imaging system to generate an HDR signal. In FIG. 5B, HCG means high conversion gain, LCG means low conversion gain, SH means sample and hold, SHR means sample and hold reset, and SHS means sample and hold signal. MCG (see FIG. 9B) means medium conversion gain.

In the origin mode readout, all charge from the photodiode, floating diffusion node and the overflow capacitor is in the LCG (low gain) read. So, for the correlated double sampling HCG read from the photodiode, which comes first, the floating diffusion node is not actually reset before the readout. Rather, it is connected to the capacitor so that charge is redistributed between them. In case there was no overflow, the reset level will hardly be affected by this and the CDS read will operate as expected. Note that the exact reset level is not critical, as it is read and subtracted from the signal level by the CDS operation. When there is overflow, the high gain read would not be used for the HDR signal. Rather, a gained-up version of the low gain signal would be used.

Figure 5C:
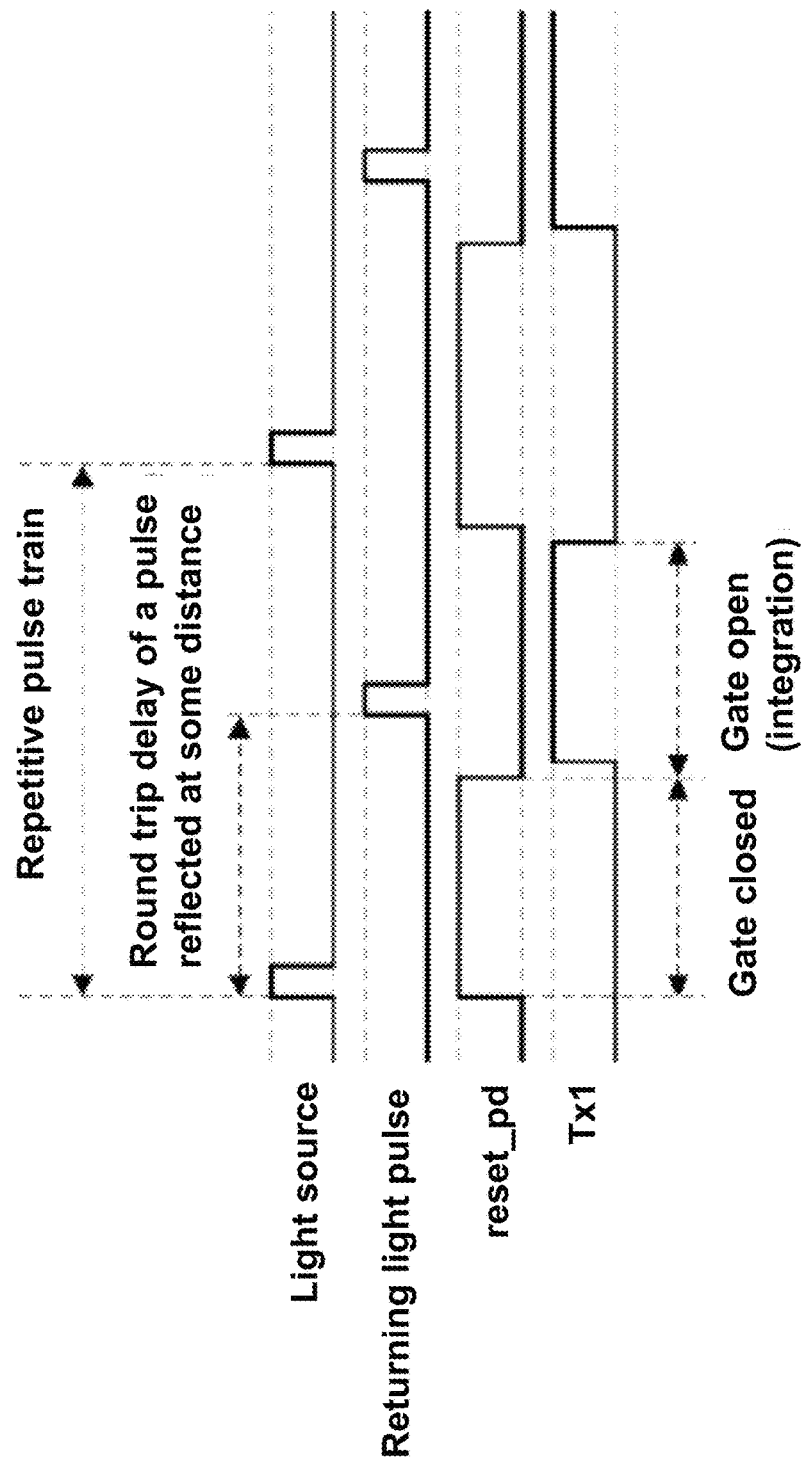
FIG. 5C illustrates an example of time gated operation in accordance with aspects of the technology.

FIG. 5C is a timing diagram 520 the that provides an example of time gated operation according to aspects of the technology. In this example, the light source (e.g., an LED or laser) emits a light pulse train, such as two or more pulses. The light pulses may each reflect from an object (or multiple objects) in the environment of the imaging system. Depending on the distance at which a reflection happens, there will be delay between the emitted and the returning pulse. Hence, the delay is indicative of the distance to the object. By modulating the reset_pd and Tx1 signals associated with transistors 406 and 408, the time at which the pixel integrates can be controlled. When reset pd is asserted there is no integration. When Tx1 is asserted, there is integration (the corresponding gate is open). Only reflected light pulses that return when Tx1 is asserted will be integrated and hence only pulses that are reflected within a certain distance range will be integrated. There may be many pulses emitted (and integrated) within one frame (image).

As an example, this approach can be used to reject light that is reflected on very nearby objects, such as snowflakes (or raindrops or dust particles) right in front of a car or other vehicle. In a conventional approach, the reflections due to nearby snowflakes (or raindrops or dust particles) could saturate the image sensor quickly and make it very difficult or impossible to see weaker reflections from objects further away (such as a stop sign, other vehicle, pedestrian, etc.). By rejecting the light from nearby reflections via time gating, it becomes possible to see the signals from further away. In a poor weather scenario, this can effectively allow the image sensor to see through snow, heavy rain, fog, etc.

Another example involves collecting signals from returning light pulses at different distances with a different light power/intensity (or a varying number of pulses). For instance, a signal that is collected from nearby range window, such as 2-5 meters, may have more light power than a signal collected from far away, such as 25-50 meters. Since the return light pulses reflected from farther away will be weaker (have lower illumination), this allows the system to balance the illumination over the different distances/ranges. This can be done by varying the intensity of the emitted light pulses for the corresponding distances. This way, objects up to a certain maximum distance would look equally well illuminated (to have substantially similar illumination levels).

FIG. 6 illustrates an alternative circuit configuration 600. This configuration is similar to the one in FIG. 4A; however, the storage gate and second transfer transistor are omitted. In particular, the pixel includes a photosensitive region (e.g., photodiode 602). As shown, photodiode 602 is coupled to a voltage source 604 having a first supply voltage $V_{dd1}$ through a photodiode reset transistor 606 (sometimes referred to as an anti-blooming transistor). As with FIG. 4A, when a control signal (e.g., a reset photodiode or "reset_pd" signal) is asserted (e.g., pulsed high) at the photodiode reset transistor 606, the photodiode 602 may be reset to the first supply voltage $V_{dd1}$. When the control signal reset_pd is de-asserted (e.g., pulsed low), the photodiode 602 may begin to accumulate charge from incident light.

Here, photodiode 602 is also connected to a first terminal (e.g., a source or drain terminal) of transfer transistor 608. A second terminal of the transfer transistor 608 is connected directly into node 610, which is a floating diffusion region. In this case, an applied control signal Tx may control both a flow of charge across the channel of the transistor 608 and a flow of charge into the floating diffusion region of node 610. When control signal Tx is asserted, image signals stored in the photodiode 602 may pass through the channel region of the transistor 608 and into the floating diffusion region. Control signal Tx may be subsequently de-asserted and the photodiode 602 may be reset to a supply voltage using control signal reset_pd.

In general, any number of desired integration processes (e.g., transferring image signals from distinct integration periods to floating diffusion region for summation) may occur. The effective integration period may be generally defined as summation of all of the distinct integration time periods, over which all of the respective individual image signals were generated. After a desired number of integration periods and integration of the corresponding image signals at the floating diffusion region, control signal Tx may be de-asserted to add a last image signal. As with the circuitry of FIG. 4A, by breaking up the effective integration period during an image frame into shorter, non-continuous integration periods that span a longer exposure time, image artifacts caused by moving objects, flickering lighting, and/or objects with changing illumination may be minimized without compromising pixel integration time (in other words, while maintaining the desired total integration time).

Node 610 of the floating diffusion region may be a doped semiconductor region (e.g., a region in a silicon substrate that is doped by ion implantation, impurity diffusion, or other doping processes). This node 610 in this circuit can serve as the primary storage region for storing charge during image data gathering operations, and may have a charge storage capacity (capacitance).

The pixel may include readout circuitry that includes a source follower transistor 612 and row select transistor 614. Transistor 614 may have a gate that is controlled by row select control signal sel. When a control signal sel is asserted, as discussed above with regard to transistor 418 of FIG. 4A, the transistor 614 is turned on and a corresponding output signal (e.g., an output signal having a magnitude that is proportional to the amount of charge at the floating diffusion region of the node 610) is passed onto a column readout path or bus line 616. As shown, the transistor 612 is coupled to a third supply voltage source 624, $V_{dd3}$, which may be the same or different than either $V_{dd1}$ or $V_{dd2}$.

The pixel may include floating diffusion reset transistor 618. This transistor 618 may have a gate that is controlled by a floating diffusion reset control signal reset_fd. The transistor 618 couples floating diffusion node 610 to a second supply voltage 620 (e.g., $V_{dd2}$) that may be the same as or different from first supply voltage $V_{dd1}$. When control signal reset_fd is asserted, the transistor 618 is turned on, which resets the capacitor 624. Then when gain_ctrl is asserted and reset_fd remains asserted, floating diffusion node 610 is reset to the second supply voltage level.

As shown in FIG. 6, equivalent to FIG. 4A, the pixel includes a gain select transistor 622 and a low gain capacitor 624. The transistor 622 may have a gate terminal controlled by a gain select control signal gain_ctrl. When control signal gain_ctrl is asserted, the transistor 622 is turned on and low gain capacitor 624 is coupled to the floating diffusion region at the node 610. Both control signals reset_fd and gain_ctrl may be asserted to reset the floating diffusion node to the supply voltage level (e.g., $V_{dd2}$).

The transistor 622 sets an overflow barrier during the integration time. Only when the voltage on the floating diffusion goes sufficiently low will this transistor conduct. Since the transistor 622 is conductive, the overflowing charge will be stored by low gain capacitor 624, while the charge below the overflow threshold remains in the floating diffusion region of node 610.

During readout, the image signals on both low gain capacitor 624 and the floating diffusion region of node 610 are sampled A high dynamic range image can then be constructed using the low gain image signal and high gain image signal. In particular, in this example configuration, the origin mode readout sequence is after the last Tx pulse, in which Tx, gain_ctrl, and reset_fd are all off. The process reads the HCG(S) signal, which was integrated on the floating diffusion. Then assert and de-assert gain_ctrl. This may not give a true reset value on the floating diffusion, but rather a strongly attenuated version of S, which is sufficient. Then read the HCG reset (R) signal, which is followed by asserting gain_ctrl. Then read the LCG S signal. Note that no charge has been lost yet, so this is an origin mode S read. Then assert and de-assert reset_fd, followed by reading the LCG R signal. Note that in the configuration of FIG. 6, the resultant HDR signal may be more susceptible to noise than the configuration of FIG. 4A. This may occur due to noise in the high gain signal of the floating diffusion region at node 610, and from reset noise. Also note that the last sample, LCG R, may be replace by an external offset calibration.

Figure 7:
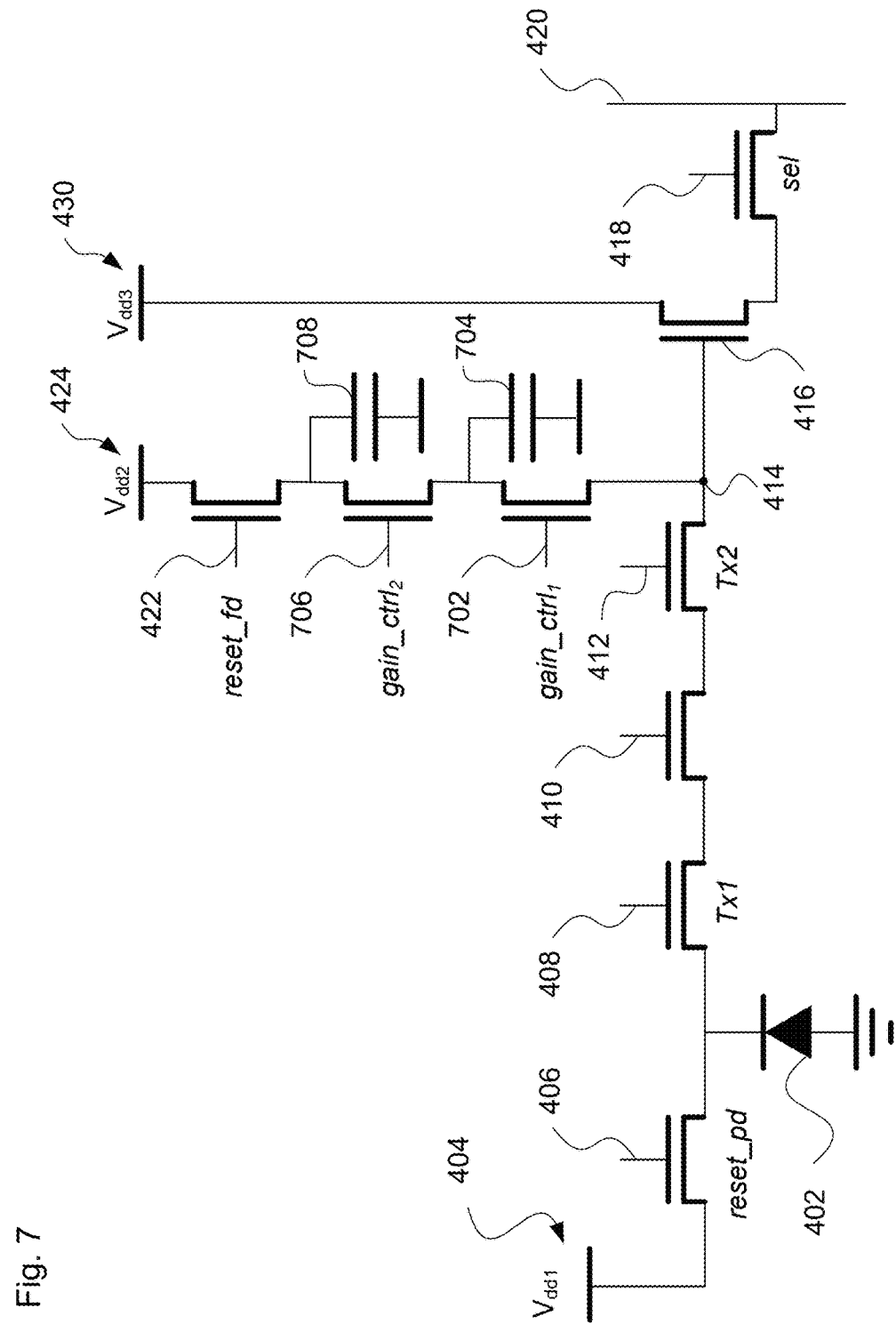
FIG. 7 is a further circuit diagram in accordance with aspects of the technology.

FIG. 7 illustrates an alternative circuit configuration 700 to the circuit of FIG. 4A, which can extend the dynamic range further without degrading the signal to noise ratio (SNR). As shown, in this configuration a pair of low gain capacitors is employed. For ease of representation, the same reference numerals are used in this figure as in FIG. 4A, except for the gain control transistors and capacitors.

In this configuration, the circuit 700 includes a first gain control transistor 702 configured to apply a first gain control signal, gain_ctrl for a first capacitor 704, and a second gain control transistor 706 configured to apply a second gain control signal, gain_ctrl$_2$ for a second capacitor 708.

In particular, As shown in FIG. 7, the transistor 702 may have a gate terminal controlled by first gain select control signal gain_ctrl$_1$. When control signal gain_ctrl$_1$ is asserted, the transistor 702 is turned on and low gain capacitor 704 is coupled to floating diffusion node 414. Similarly, the transistor 706 may have a gate terminal controlled by second gain select control signal gain_ctrl$_2$. When control signal gain_ctrl$_2$ is asserted, the transistor 706 is turned on and low gain capacitor 708 is coupled to floating diffusion node 414. The control signals reset_fd, gain_ctrl$_1$ and gain_ctrl$_2$ may be asserted to reset floating diffusion node 414 to the supply voltage level (e.g., $V_{dd2}$). FIG. 7 shows the dual overflow in a series configuration. It is also possible to have dual overflow in a parallel configuration where both gain_ctrl$_1$ and gain_ctrl$_2$ connect to the floating diffusion node 414. The order in which the overflow goes first to e.g., capacitor 704 and only then to capacitor 708 is in that case coming from having two different overflow barriers in gain_ctrl$_1$ and gain_ctrl$_2$ e.g., by applying different control voltage or by differences in layout or process for these two transistors.

During operation of the pixel, the second transfer transistor 412 may be set with an overflow threshold. The storage gate 410 may be configured to store integrated image signals from combining individual signals across multiple distinct integration periods. When integrated image signals at the storage gate 410 exceed the overflow threshold, charge is able to overflow to the floating diffusion region at node 414. The transistor 702 may remain on during any integration process occurring at the storage gate 410. For instance, transistor 702 can remain on during the integration, but typically it will set an additional overflow barrier. Transistor 706 sets an additional overflow barrier, otherwise 708 and 704 would have the same signal. The overflowing charge will be stored by low gain capacitor(s) 704 and/or 708, while the charge below the overflow threshold remains in the storage gate 410.

FIG. 7 shows a dual overflow configuration, in which the capacitance of the first and second capacitors may be selected to obtain enhanced SNR. When the voltage on capacitor 704 drops too deep, the second capacitor 708 receives overflow current. As the capacitance gets larger, the gain gets lower. Thus, for the same signal, with a larger capacitor the noise will get worse. However, the circuit can have reduced noise with a smaller capacitor. By way of example, the capacitance of capacitor 708 may be significantly higher (e.g., one or more orders of magnitude higher) than the capacitance of capacitor 704. By way of example only, the capacitor 704 may be on the order of 30 fF, while the capacitor 708 may be on the order of 1 pF, and the floating diffusion 414 is on the order of 1 fF.

During readout, the image signals on each of the capacitors 704 and 708 and the storage gate 410 are sampled. Thus, there are 3 signals that are read out, then added together. This can involve gaining up the corresponding signals before adding them together. For instance, the three signals may each be gained up such that their overall conversion gain is the same, e.g., have the same number of bits per incoming electron. In one example, the image signal stored by the capacitor 704 may first be sampled by the readout circuitry, which includes transistors 416 and 418 and the bus line 420. Then the image signal stored by the capacitor 708 may be sampled by the readout circuitry. This could be done so that no charge is lost. In other examples, the sampling order may be reversed or performed concurrently.

Upon sampling from both capacitors, the floating diffusion 414 may be reset via the reset_fd signal, and a reset voltage level may be sampled (e.g., $V_{dd2}$). The reset voltage level may be subtracted from the image signal for the capacitors 704 and/or 708 for a double sampling read with uncorrelated noise of the low gain image signal. Alternatively, an external offset calibrated for the reset voltage level may be used for the low gain image signal.

After sampling the reset voltage level, the high gain image signal (at storage gate 410) may be sampled. Prior to reading out the high gain image signal, control signals gain_ctrl$_1$ and/or gain_ctrl$_2$ may be de-asserted. The high gain image signal readout may be a correlated double sampling readout. A high dynamic range image can then be constructed using the low gain image signals and high gain image signal.

Note that the readout may be done using an origin mode approach, where each signal read-out will have a response starting at the origin. Alternatively, the readout may be done using a hockey stick mode approach, where the signal from storage gate 410 has immediate response, but overflow from the capacitors 704 and 708 would only have a response when there is overflow.

Figure 8A:
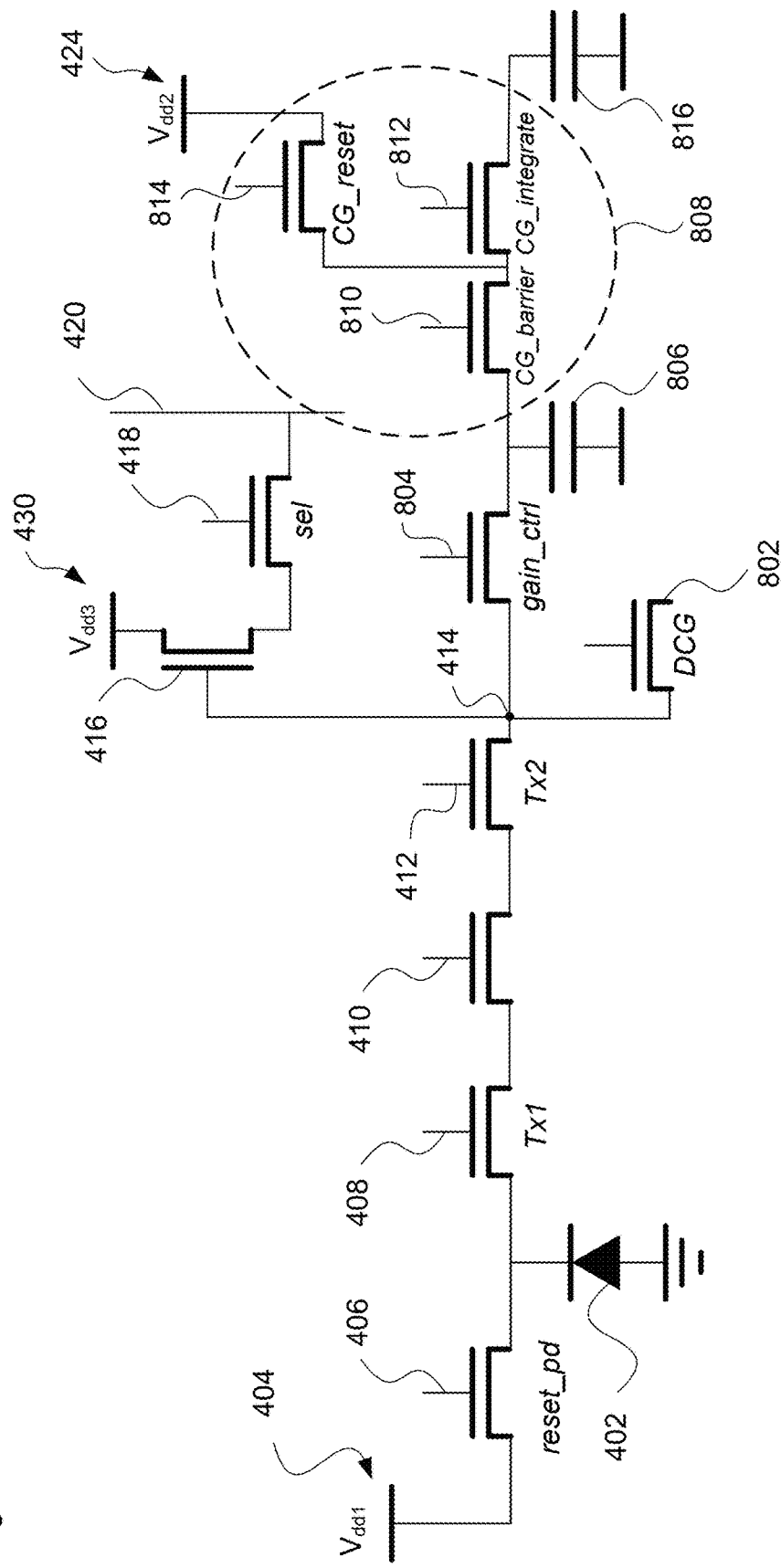
FIG. 8A is yet another circuit diagram in accordance with aspects of the technology.

FIG. 8A illustrates another circuit configuration 800, in which the dual overflow approach can be extended with a coupled gate arrangement that is configured to modulate the overflow current in the time domain. In this configuration, most of the current can be routed to the supply (e.g., $V_{dd2}$ and/or $V_{dd3}$), with only a small fraction of the current being stored on a second capacitor. This allows for a reduced capacitance with the second capacitor or otherwise extends the dynamic range further while keeping the same capacitance.

As shown, the left side of the circuit configuration 800 is the same as in FIG. 4A, and operates in the same manner described above. On the right side, starting with the floating diffusion region of node 414, the circuit has additional features to provide a dual conversion gain feature and an overflow modulation feature. Similar to FIG. 4A, when integrated image signals at the storage gate 410 exceed the overflow threshold, charge is able to overflow to the floating diffusion region at node 414. The overflowing charge will be stored by dual overflow capacitors as discussed below, while the charge below the overflow threshold remains in the storage gate 410. As shown, the transistor 416 is coupled to the third supply voltage source 430, $V_{dd3}$, which may be the same or different than either $V_{dd1}$ or $V_{dd2}$. Similar to the discussion regarding readout in FIG. 4A, transistor 418 may have a gate that is controlled by row select control signal sel. When a control signal sel is asserted, the transistor 418 is turned on and a corresponding output signal (e.g., an output signal having a magnitude that is proportional to the amount of charge at floating diffusion node 414) is passed onto a column readout path or bus line 420.

In the right side of this configuration, the circuit 800 includes a transistor 802 configured to apply a dual conversion gain (DCG) signal, as well as a first gain control transistor 804 configured to apply a gain control signal, gain_ctrl for a first capacitor 806. The DCG signal is used for lowering the conversion gain of the diffusion node 414 by adding a small capacitance to it. In this case, the gate capacitance of the transistor 802 is the added capacitance. Alternatively, a device corresponding to transistor 802 could be configured as a switch that connects floating diffusion node 414 to an additional capacitor.

This configuration has a coupled gate arrangement 808 as shown by the dashed area, which includes transistor 810 configured to apply a CG_barrier signal, transistor 812 configured to apply a CG_integrate signal, and transistor 814 configured to apply a CG_reset signal. The transistor 812 is coupled to a second capacitor 816, while the transistor 814 is coupled to the supply (here, $V_{dd2}$, 424). The purpose of the coupled gates in the arrangement 808 is to modulate the overflow current in the time domain. A small fraction of the charge is integrated and a large fraction goes to the voltage supply. The CG_barrier device, transistor 810, sets an overflow barrier over which current will start to flow when the voltage on 806 drops sufficiently low. Where the overflow current flows in response to the CG_barrier signal depends on the CG_integrate and CG_reset signals. The control signals of the CG_integrate and the CG_reset devices are complementary, as only one is on at a time. Most of the current would go to the supply, so CG_reset will have a large duty cycle while CG_integrate has a small duty cycle. To reset capacitor 806 or floating diffusion node 414, the transistors for both CG_reset and CG_barrier need to be fully on. For the floating diffusion node 414, the transistor for gain_ctrl also needs to be fully on. To reset the capacitor 816, the transistors for both CG_reset and CG_integrate needs to be fully on. In addition, the transistor for CG_barrier may need to be fully on.

Figure 8B:
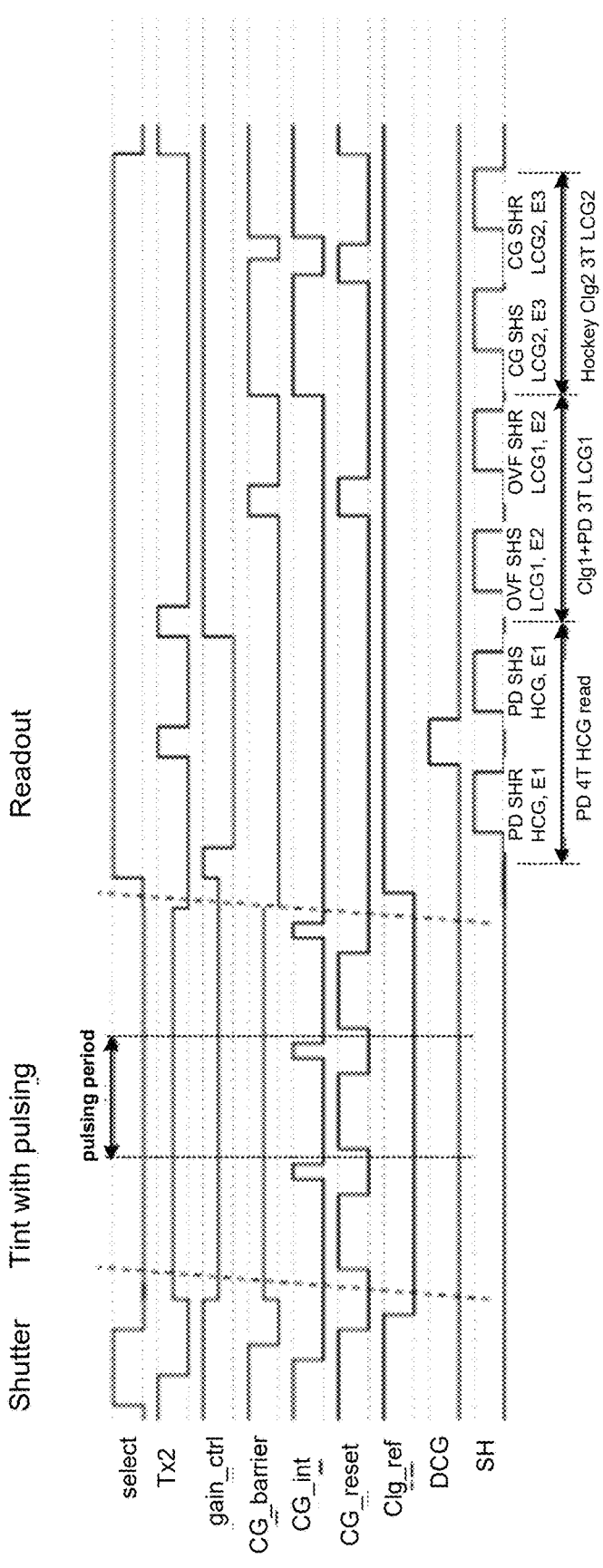
FIG. 8B is a timing diagram corresponding to operation of the circuit of FIG. 8A.

FIG. 8B illustrates an example timing diagram 850 for such operation of circuit 800. Note that reset_pd and Tx1 are not explicitly shown in this figure; however, they are modulated during the integration time as in FIG. 5C. Since both reset_pd/Tx1 and CG_reset/CG_integrate are modulated, the relation between both modulations is important. As an example, CG_integrate could integrate the overflow signal only during 1 out of 10 cycles (or more or less), where Tx1 is integrating the PD signal on the storage gate.

During operation of the pixel, the second transfer transistor 412 may be set with an overflow threshold. The storage gate 410 may be configured to store integrated image signals from combining individual signals across multiple distinct integration periods. When integrated image signals at the storage gate 410 exceed the overflow threshold, charge is able to overflow to the floating diffusion region at node 414. The overflowing charge will be stored by low gain capacitors 806 and/or 816, while the charge below the overflow threshold remains in the storage gate 410. In this configuration, most of the current that flows past the first capacitor 806 can be routed to the supply (e.g., $V_{dd2}$), with only a small fraction of the current being stored on the second capacitor 816. This allows for a reduced capacitance with the second capacitor 816, or otherwise extends the dynamic range further while keeping the same capacitance. In particular, this configuration is able to integrate only a fraction of the overflow current onto the second capacitor 816 (e.g., on the order of 10%, or more or less), while draining away the unwanted current to the supply.

During readout, the image signals on each of the capacitors 806 and 816 and the storage gate 410 are sampled. Thus, as with the configuration of FIG. 7, there are 3 signals that are read out, gained appropriately, and then added together. In one example, the image signal stored by the capacitor 806 may first be sampled by the readout circuitry, which includes transistors 416 and 418 and the bus line 420. Then the image signal stored by the capacitor 816 may be sampled by the readout circuitry. This could be done so that no charge is lost.

Upon sampling from both capacitors, the floating diffusion 414 may be reset via the reset_fd signal, and a reset voltage level may be sampled (e.g., $V_{dd3}$ or $V_{dd2}$). The reset voltage level may be subtracted from the image signal for the capacitors 806 and/or 816 for a double sampling read with uncorrelated noise of the low gain image signal. Alternatively, an external offset calibrated for the reset voltage level may be used for the low gain image signal.

After sampling the reset voltage level, the high gain image signal (at storage gate 410) may be sampled. Prior to reading out the high gain image signal, control signal gain_ctrl may be de-asserted. The high gain image signal readout may be a correlated double sampling readout. A high dynamic range image can then be constructed using the low gain image signal and high gain image signal.

As discussed above, the readout may be done using an origin mode approach, where each signal read-out will have a response starting at the origin. This would be done between the reads from 410 and 806. The read from 816 would always be done in hockey stick mode. Alternatively, the readout may be done using the hockey stick mode approach, where the signal from storage gate 410 has immediate response, but overflow from the capacitors 806 and 816 would only have a response when there is overflow.

Figure 9A:
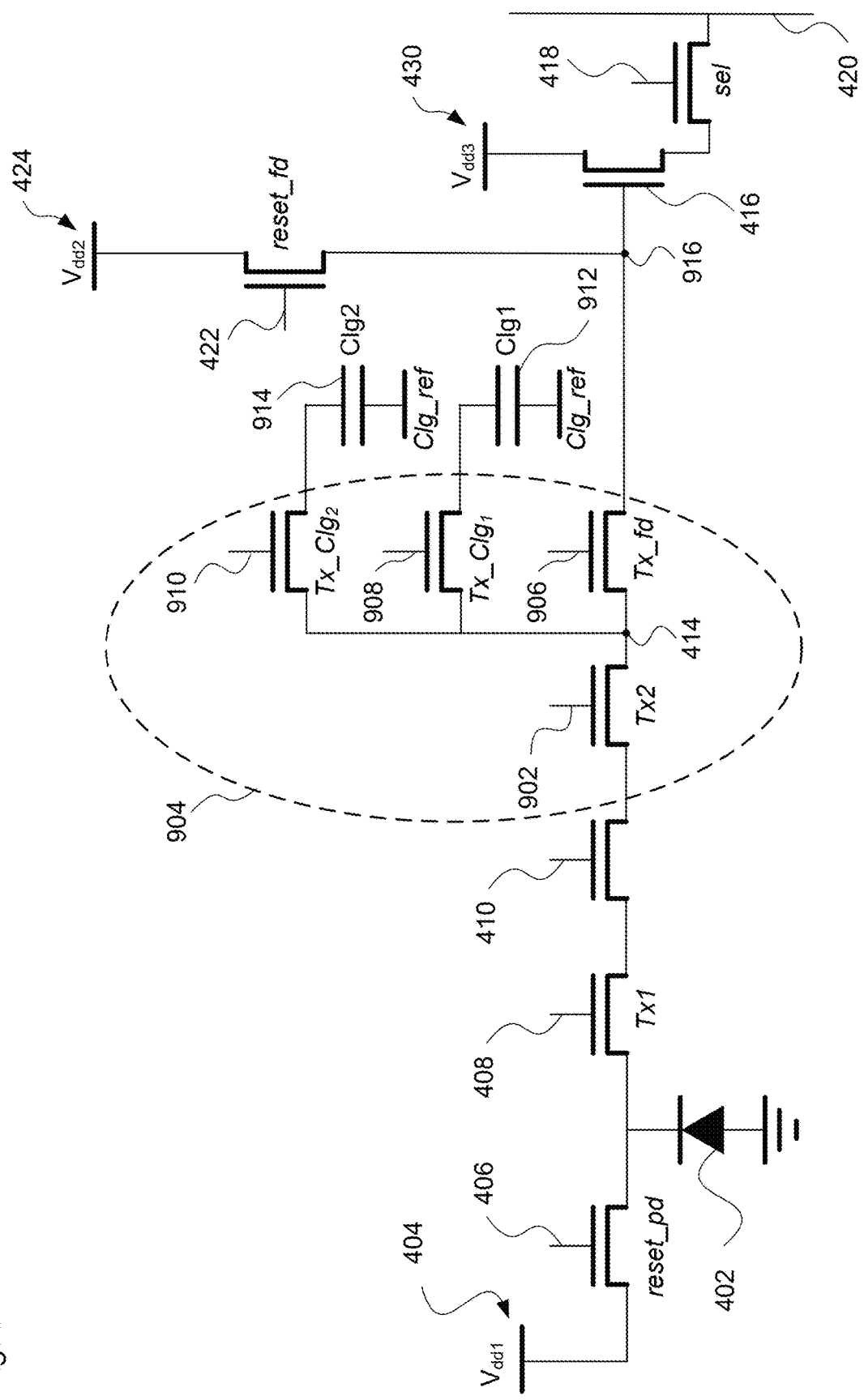
FIG. 9A is another circuit diagram in accordance with aspects of the technology.

FIG. 9A illustrates another circuit configuration 900, in which the modulation of the overflow current can also be done directly at the first overflow from floating diffusion node 916. In this case the modulation of the overflow current will be in sync with the gating of the integration itself. A key benefit of this configuration is that the system can decide configuration where the charge goes-either to source, the first capacitor or the second capacitor. Thus, the image sensor can store most of the charge on one capacitor and only a small fraction on the other capacitor (e.g., 10-20% or less of the charge on the other capacitor).

As shown, the left side of the circuit configuration 900 is similar to the configuration in FIG. 4A up to and including the storage gate 410. On the right side, between the storage gate 410 and node 414, there is a transistor 902 that provides a Tx2 signal.

In this configuration, there is a set of coupled gates 904, which includes the transistor 902 as well as transistors 906, 908 and 910. The transistor 906 is configured to apply a floating diffusion signal (Tx_fd). The transistor 908 is configured to apply a first modulation signal (Tx_Clg$_1$) for a first capacitor 912 (Clg1), while the transistor 910 is configured to apply a second modulation signal (Tx_Clg$_2$) for a second capacitor 914 (Clg2). Tx_Clg$_1$ and Tx_Clg$_2$ are the modulation signals that decide where the overflow signal is integrated during the integration time. Tx_fd can be selected during the integration time to drain overflow current away to the supply. Tx_fd is also used for the high gain CDS readout of the signal on storage gate 410. For transferring from storage gate 410 to the floating diffusion node 416, both Tx2 and Tx_fd need to be on. Thus, in this configuration, one capacitor can saturate (e.g., "Clg$_1$" or capacitor 912), but the other capacitor would not saturate (e.g., "Clg$_2$" or capacitor 914). FIG. 9B illustrates timing diagram 950 showing shutter operation, integration and readout according to this configuration.

Figure 10:
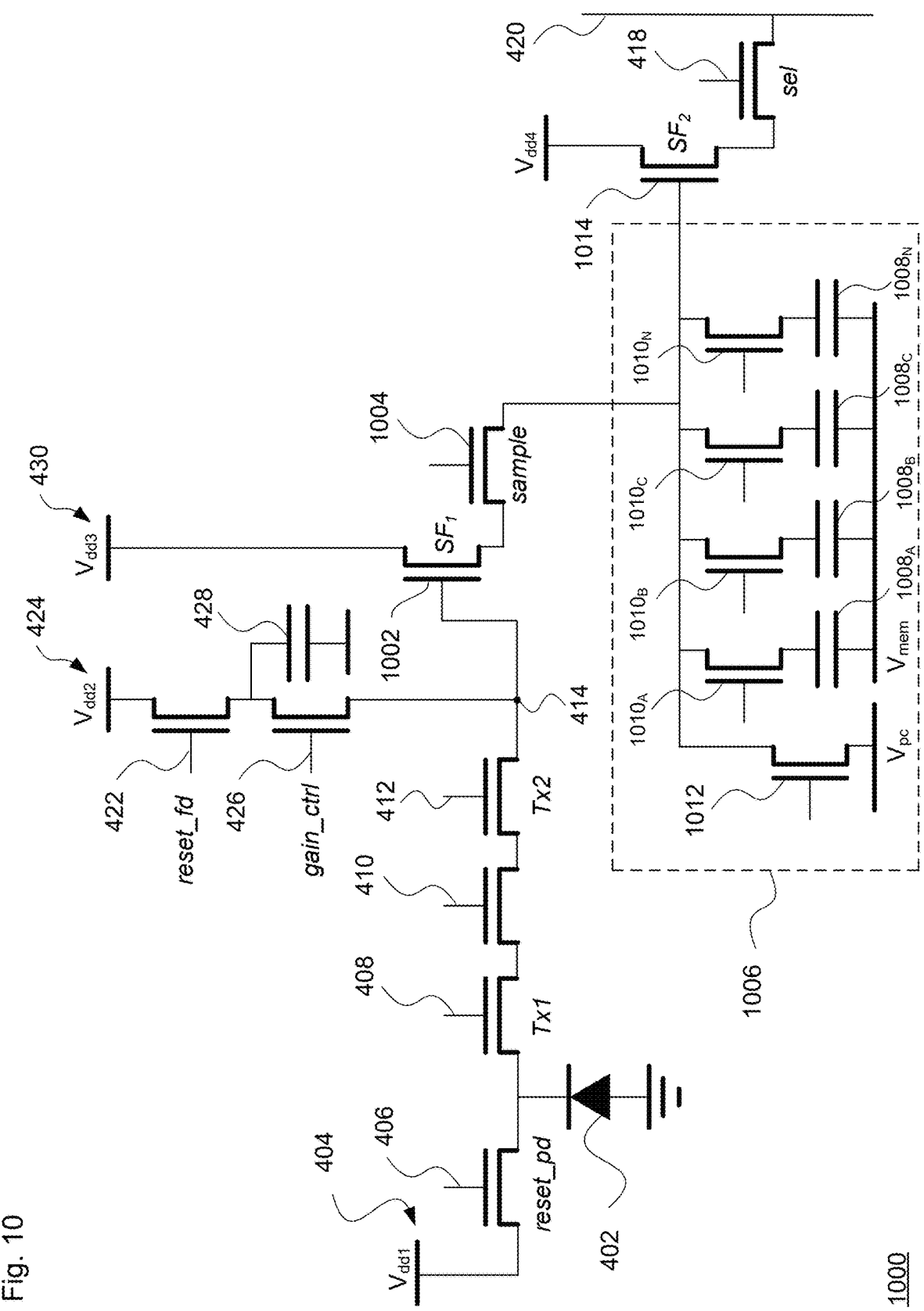
FIG. 10 is a further circuit diagram in accordance with aspects of the technology.

FIG. 10 illustrates yet another circuit configuration 1000, in which the pixel can support pipeline global shutter operation (integrate while performing a read operation) and/or subtract the R (reset) and S (set) signals in the pixel for a correlated double sample operation.

As shown, coupled to the floating diffusion region at node 414 is a transistor 1002 that is configured to apply a signal (SF$_1$). The transistor 1002 is also coupled to a source (e.g., V$_{dd3}$, 430) as well as a transistor 1004 that is configured to apply a sample signal (sample). The transistor 1004 is coupled to storage circuitry 1006.

The storage circuitry 1006 includes a set of capacitors 1008$_A$, 1008$_B$, ..., 1008$_N$, each configured to store a voltage corresponding to a different image frame. In the example of FIG. 10, the storage circuitry 1006 is shown as having four such capacitors, although more or fewer capacitors may be used in which each is configured to store any corresponding voltage associated with one or more image frames.

As shown, each capacitor 1008 has a first terminal coupled to a voltage terminal V$_{mem}$. This voltage terminal may supply any suitable fixed voltage or variable voltage signal. Each capacitor 1008 is coupled to a corresponding transistor 1010 (e.g., 1010$_A$, 1010$_B$, ..., 1010$_N$,) that selectively provides access to the storage terminal of the corresponding capacitor. For instance, transistor 1010$_A$ may be activated to access the storage terminal of capacitor 1008$_A$, etc.

The storage circuitry 1006 as shown includes a transistor 1012 coupling the output of the transistor 1004 to one of the corresponding capacitor access transistors 1010. A control signal may be used to selectively activate each transistor 1010 to store an output signal from the transistor 1004 onto a corresponding storage capacitor 1008. The storage circuitry 1006 is coupled to the row select transistor 418 and readout line 420 via transistor 1014, which is configured to apply a signal (SF$_2$).

SF$_1$ is used to write the FD voltage in the different phases of the readout (as in FIG. 5B) onto the capacitors 1008. There are two operating modes for transistor 1012. One operating mode is a bias current source for SF$_1$ (transistor 1002). In this case, the transistor 1002 settles to the correct value while one of the 1010 sample transistors is on and that value is sampled on the sample/hold by switching off the transistor 1010. In the other operating mode, transistor 1012 is used as a pre-charge ("pc") switch to pre-charge the capacitors 1008 to a low voltage (V$_{pc}$). The SF$_1$ transistor 1002 can only pull the capacitors to a higher voltage. Eventually, as the voltage increases the SF gets slower until it switches itself of (at ~V$_{GS}$=V$_t$). Note that it never switches completely off, so the voltage will creep higher with more time. However, when transistor 1010 is switched off, the voltage is sampled on 1008 and stays there until the readout. For the readout sample, transistor 1004 is off and transistor 1012 is used to pre-charge the gate of the SF$_2$ transistor 1014 to V$_{pc}$ prior to connecting one of the capacitors 1008 to it. The voltage on each capacitor 1008 is read out through 1014, 418 and 420.

Figure 11:
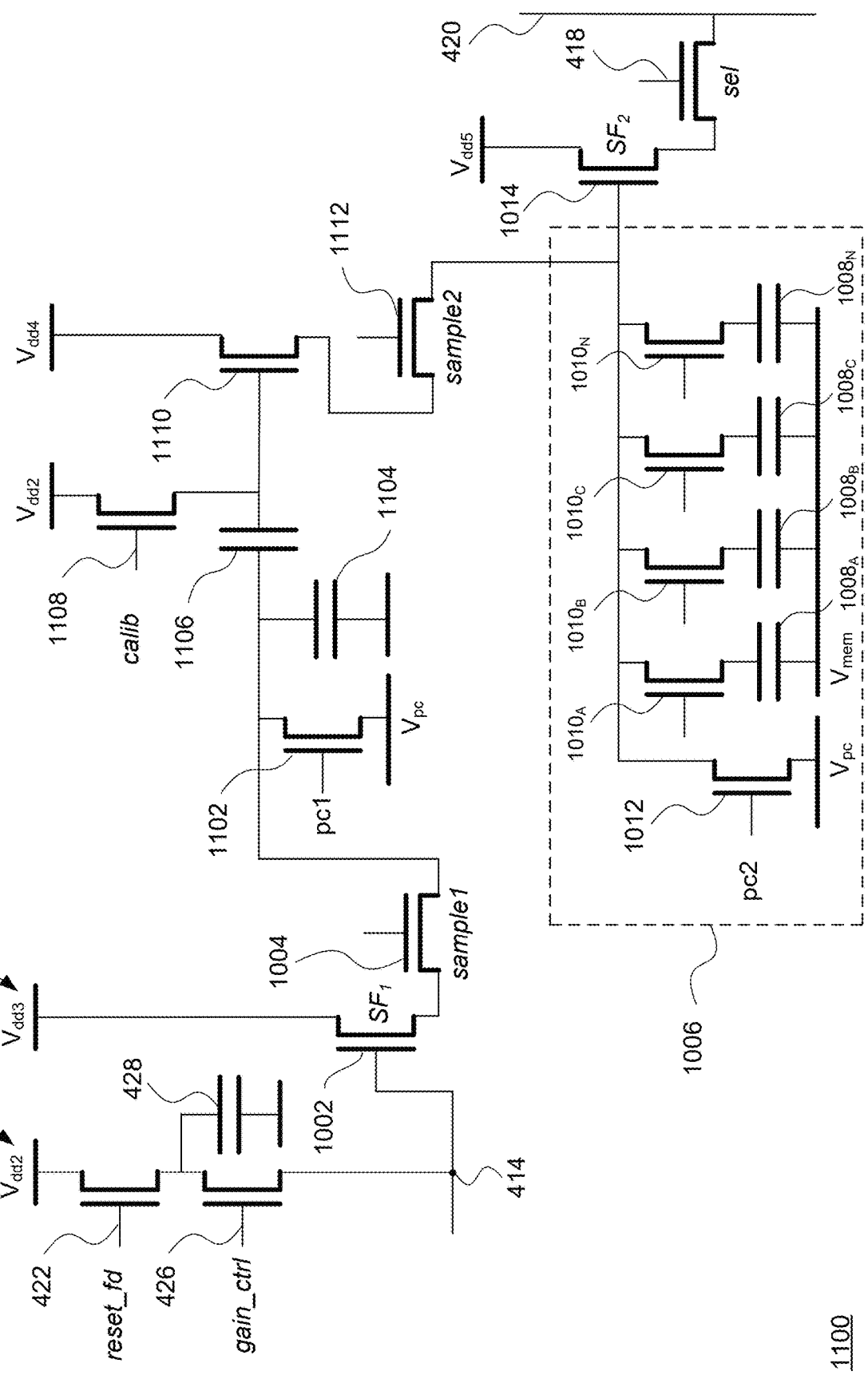
FIG. 11 is yet another circuit diagram in accordance with aspects of the technology.

FIG. 11 illustrates a variation 1100 of the circuitry of FIG. 10, which incorporates in-pixel CDS, and has sample and holds for storage of the signals for a global shutter. In this figure, everything to the left of node 414 of FIG. 10 is omitted for clarity. As shown, the transistor 1004 is configured to apply a first sample signal (sample1), and couples indirectly to the storage circuitry 1006 via a correlated double sampling (CDS) section. This section includes a transistor 1102 associated with a pre-charge signal pc1, which is connected to a first capacitor 1104 and a second capacitor 1106. The capacitor 1106 is coupled to transistor 1108, which has a gate that is controlled by a calibration control signal calib. The capacitor 1106 is also coupled to transistor 1110, which connects to another transistor 1112 that is configured to apply a second sample signal (sample2). The transistor 1112 is coupled to the storage circuitry 1006. In this configuration, the transistor 1012 is associated with another pre-charge signal pc2.

The CDS circuitry between sample1 and sample2 works as follows. It subtracts two samples on the series capacitor 1106. For instance, when the R signal comes first and then the S signal comes second. The SF$_1$ transistor 1002 writes R on the left side of capacitor 1106, while the right side connect to V$_{dd2}$ through 1108, which is on when calib is asserted. Next, calib is de-asserted and the voltage difference between R and V$_{dd2}$ is stored on capacitor 1106. This reference signal will be stored on 1006. Next, SF$_1$ writes S to the left side of 1106 while 1108 is off. When the left side of 1106 goes down from the R level to the S level, the right side will follow. On the right side the result will be have ref-(R-S). Hence, this provides a subtracted signal needed for the in-pixel CDS operation. This signal can now also be stored at block 1006. Readout occurs in the manner discussed above with regard to FIG. 10.

Thus, it can be seen that the circuits illustrated in the drawings and described herein provide significant technical benefits, such as achieving high dynamic range (HDR) functionality with a time gated pixel architecture.

Figure 12:
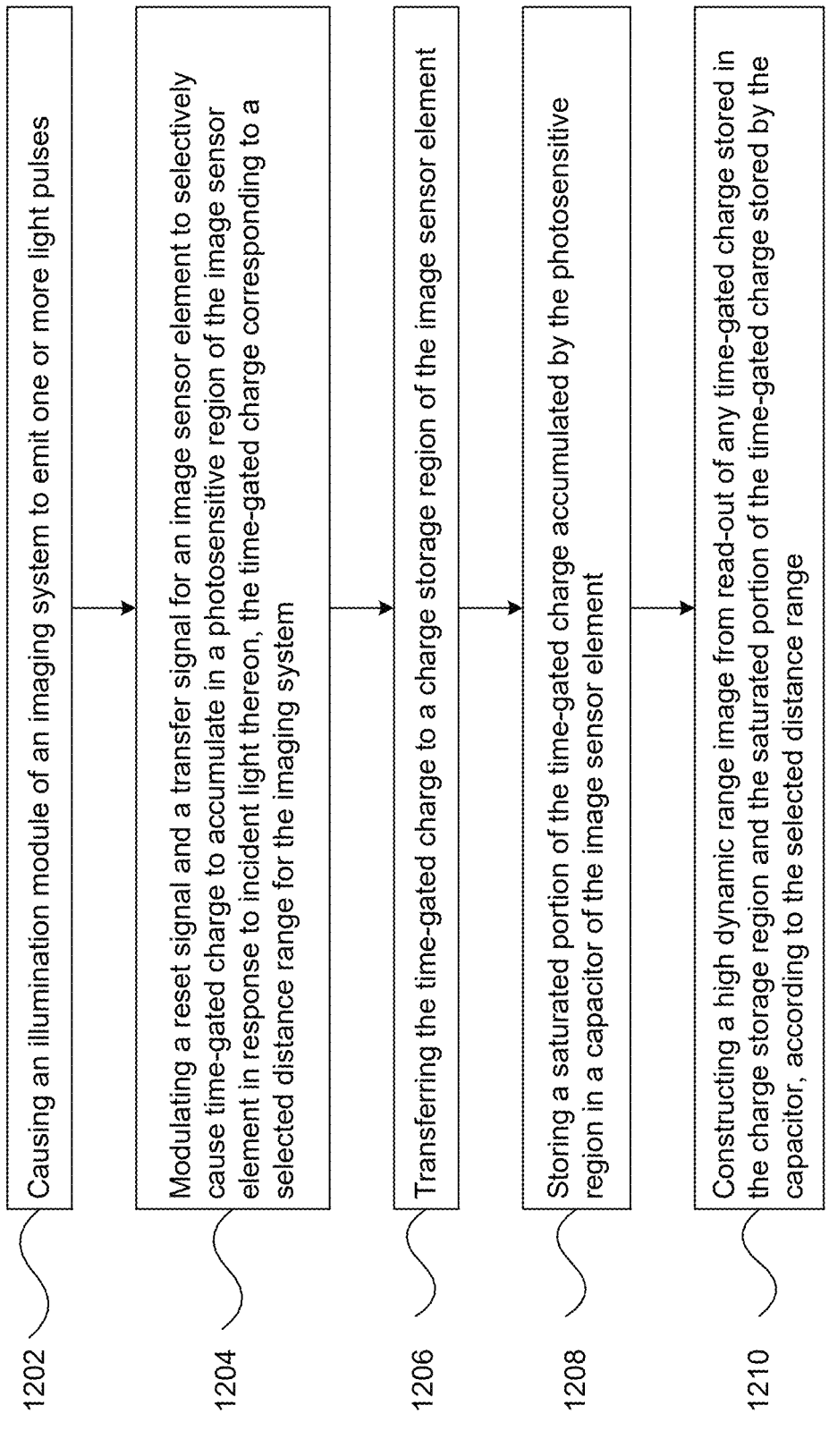
FIG. 12 illustrates an example method in accordance with aspects of the technology.

FIG. 12 illustrates a method 1200, which at block 1202 includes causing an illumination module of an imaging system to emit one or more light pulses. At block 1204 the method includes modulating a reset signal and a transfer signal for an image sensor element to selectively cause time-gated charge to accumulate in a photosensitive region of the image sensor element in response to incident light thereon. The time-gated charge corresponds to a selected distance range for the imaging system. At block 1206 the method includes transferring the time-gated charge to a charge storage region of the image sensor element. At block 1208 the method includes storing a saturated portion of the time-gated charge accumulated by the photosensitive region in a capacitor of the image sensor element. And at block 1210, the method includes constructing a high dynamic range image from read-out of any time-gated charge stored in the charge storage region and the saturated portion of the time-gated charge stored by the capacitor, according to the selected distance range.

Although the technology herein has been described with reference to particular embodiments/configurations, it is to be understood that these are merely illustrative of the principles and applications of the present technology. It is therefore to be understood that numerous modifications may be made to the illustrative embodiments and that other arrangements may be devised without departing from the spirit and scope of the present technology as defined by the appended claims. By way of example only, components that are illustrated as being arranged in series may have a complementary configuration in parallel; similarly, components that are illustrated as being arranged in parallel may have a complementary configuration in series.

The invention claimed is:

1. An image sensor element, comprising:
  a photosensitive region configured to generate charge in response to incident light on the image sensor element;
  a charge storage region configured to store at least a portion of the charge generated by the photosensitive region;
  a first actuating element electrically coupling the photosensitive region to the charge storage region, the first actuating element configured to enable charge transfer from the photosensitive region to the charge storage region according to a transfer control signal;
  a floating diffusion region coupled to the first actuating element;
  a second actuating element responsive to a gain control signal, the second actuating element having a first node connected to the floating diffusion region;
  a third actuating element responsive to a reset control signal, the third actuating element having a first node coupled to a second node of the second actuating element, and a second node coupled to a voltage supply;
  a capacitor having a first node connected to the second node of the second actuating element, the capacitor being operatively coupled to the first node of the third actuating element; and
  readout control circuitry configured to read out charge stored in the charge storage region and charge stored by the capacitor;
  wherein:
    the second actuating element, in response to the gain control signal, is configured to electrically couple the capacitor to the floating diffusion region to receive a saturated portion of the charge generated by the photosensitive region;
    integration for imaging is time-gated to correspond with a pulsed light source to achieve a selected distance range detectable by the image sensor element; and
    a high dynamic range image is constructable from the read out of the charge stored in the charge storage region and the charge stored by the capacitor according to the time-gated integration.

2. The image sensor element of claim 1, wherein the third actuating element, in response to the reset control signal, is configured:
  in a first mode, to reset the capacitor but not reset the floating diffusion region; and
  in a second mode, to reset at least both the floating diffusion region and the capacitor.

3. The image sensor element of claim 1, wherein the second actuating element is configured to set a selectable overflow threshold for an amount of the saturated portion of the charge to be received by the capacitor.

4. The image sensor element of claim 1, wherein:
  the charge stored by the capacitor represents a low gain image signal; and
  at read out by the readout control circuitry, a reset voltage level is subtracted from the low gain image signal for a double sampling read with uncorrelated noise of the low gain image signal.

5. The image sensor element of claim 1, wherein the readout control circuitry is configured to first read out the charge stored in the charge storage region and then read out the charge stored by the capacitor.

6. The image sensor element of claim 1, wherein the readout control circuitry is configured to first read out the charge stored by the capacitor and then read out the charge stored in the charge storage region.

7. The image sensor element of claim 1, further comprising:
  a fourth actuating element disposed between the floating diffusion region and the charge storage region;
  wherein:
    the transfer control signal for the first actuating element is a first transfer control signal;
    the fourth actuating element is responsive to a second transfer control signal; and
    a level of the second transfer control signal sets an overflow threshold for an amount of the saturated portion of the charge to be received by the capacitor.

8. The image sensor element of claim 7, wherein the capacitor is a first capacitor and the gain control signal is a first gain control signal, and the image sensor element further comprises:
  a fifth actuating element responsive to a second gain control signal, the fifth actuating element having a first node connected to the second node of the second actuating element; and
  a second capacitor having a first node connected to a second node of the fifth actuating element;
  wherein:
    the first node of the third actuating element is coupled to the second node of the fifth actuating element and to first node of the second capacitor;
    the first gain control signal is used to read out charge from the first capacitor; and
    the second gain control signal is used to read out charge from the second capacitor.

9. The image sensor element of claim 8, wherein overflow charge from the charge storage region is able to flow into the second capacitor upon overflow of the first capacitor.

10. The image sensor element of claim 8, wherein capacitance of the second capacitor is greater than capacitance of the first capacitor.

11. The image sensor element of claim 8, wherein the high dynamic range image is constructable from the read out of the charge stored in the charge storage region, the charge stored by the first capacitor, and the charge stored by the second capacitor.

12. The image sensor element of claim 8, wherein the fifth actuating element has a coupled gate arrangement and is configured to modulate overflow current in the time domain.

13. The image sensor element of claim 12, wherein modulation of overflow current is performed synchronously with integration gating.

14. The image sensor element of claim 1, wherein the image sensor element is configured to perform a global shutter operation.

15. A method, comprising:
causing an illumination module of an imaging system to emit one or more light pulses;
modulating a reset signal and a transfer signal for an image sensor element to selectively cause time-gated charge to accumulate in a photosensitive region of the image sensor element in response to incident light thereon, the time-gated charge corresponding to a selected distance range for the imaging system;
transferring the time-gated charge to a charge storage region of the image sensor element;
storing a saturated portion of the time-gated charge accumulated by the photosensitive region in a capacitor of the image sensor element; and
constructing a high dynamic range image from read-out of any time-gated charge stored in the charge storage region and the saturated portion of the time-gated charge stored by the capacitor, according to the selected distance range.

16. The method of claim 15, further comprising selectively setting an overflow threshold for an amount of the saturated portion of the time-gated charge to be received by the capacitor.

17. The method of claim 15, wherein:
the charge stored by the capacitor represents a low gain image signal; and
at read out by readout control circuitry of the image sensor element, subtracting a reset voltage level from the low gain image signal for a double sampling read with uncorrelated noise of the low gain image signal.

18. The method of claim 15, further comprising performing, by readout control circuitry of the image sensor element, reading out the charge stored in the charge storage region and then performing reading out the charge stored by the capacitor.

19. An imaging system, comprising:
an illumination module configured to emit one or more light pulses; and
an image sensor element, comprising:
a photosensitive region configured to generate charge in response to incident light on the image sensor element;
a charge storage region configured to store at least a portion of the charge generated by the photosensitive region;
a first actuating element electrically coupling the photosensitive region to the charge storage region, the first actuating element configured to enable charge transfer from the photosensitive region to the charge storage region according to a transfer control signal;
a floating diffusion region coupled to the first actuating element;
a second actuating element responsive to a gain control signal, the second actuating element having a first node connected to the floating diffusion region;
a third actuating element responsive to a reset control signal, the third actuating element having a first node coupled to a second node of the second actuating element, and a second node coupled to a voltage supply;
a capacitor having a first node connected to the second node of the second actuating element, the capacitor being operatively coupled to the first node of the third actuating element; and
readout control circuitry configured to read out charge stored in the charge storage region and charge stored by the capacitor;
wherein:
the second actuating element, in response to the gain control signal, is configured to electrically couple the capacitor to the floating diffusion region to receive a saturated portion of the charge generated by the photosensitive region;
integration for imaging is time-gated to correspond with pulsing by the illumination module to achieve a selected distance range detectable by the image sensor element; and
a high dynamic range image is constructable from the read out of the charge stored in the charge storage region and the charge stored by the capacitor according to the time-gated integration.

20. The imaging system of claim 19, wherein the second actuating element is configured to set a selectable overflow threshold for an amount of the saturated portion of the charge to be received by the capacitor.

* * * * *